(12) United States Patent
Garg et al.

(10) Patent No.: US 8,605,090 B2
(45) Date of Patent: Dec. 10, 2013

(54) MODIFYING AND FORMATTING A CHART USING PICTORIALLY PROVIDED CHART ELEMENTS

(75) Inventors: Anupam Garg, Redmond, WA (US); Eric W. Patterson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 11/445,393

(22) Filed: Jun. 1, 2006

(65) Prior Publication Data

US 2007/0279417 A1 Dec. 6, 2007

(51) Int. Cl.
*G06T 11/20* (2006.01)
(52) U.S. Cl.
USPC .......................................................... 345/440
(58) Field of Classification Search
CPC .................................................... G06T 11/206
USPC .......................................................... 345/440
See application file for complete search history.

(56) References Cited

U.S. PATENT DOCUMENTS

| | | | |
|---|---|---|---|
| 4,823,283 A | 4/1989 | Diehm et al. | |
| 5,155,806 A | 10/1992 | Hoeber et al. | 715/711 |
| 5,220,675 A | 6/1993 | Padawer et al. | |
| 5,247,438 A | 9/1993 | Subas et al. | |
| 5,305,435 A | 4/1994 | Bronson | |
| 5,323,314 A | 6/1994 | Baber et al. | |
| 5,377,354 A | 12/1994 | Scannell et al. | 718/103 |
| 5,412,772 A | 5/1995 | Monson | |
| 5,461,708 A | 10/1995 | Kahn | |
| 5,500,936 A | 3/1996 | Allen et al. | 395/156 |
| 5,519,606 A | 5/1996 | Frid-Nielsen et al. | 705/9 |
| 5,559,875 A | 9/1996 | Bieselin et al. | |
| 5,559,944 A | 9/1996 | Ono | 715/841 |
| 5,570,109 A | 10/1996 | Jenson | 715/823 |
| 5,581,677 A | 12/1996 | Myers et al. | |
| 5,588,107 A | 12/1996 | Bowden et al. | |
| 5,592,602 A | 1/1997 | Edmunds | |
| 5,596,694 A | 1/1997 | Capps | 345/473 |
| 5,625,783 A | 4/1997 | Ezekiel et al. | 395/352 |
| 5,634,100 A | 5/1997 | Capps | 705/9 |
| 5,634,128 A | 5/1997 | Messina | 710/200 |
| 5,638,504 A | 6/1997 | Scott et al. | 715/202 |

(Continued)

FOREIGN PATENT DOCUMENTS

| | | |
|---|---|---|
| AU | 2005203411 | 3/2003 |
| AU | 20070255043 | 8/2012 |

(Continued)

OTHER PUBLICATIONS

Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.*

(Continued)

*Primary Examiner* — Jeffery A Brier
(74) *Attorney, Agent, or Firm* — Merchant & Gould

(57) ABSTRACT

Methods and systems are provided for modifying a chart. Chart elements are provided to a user pictorially. Each picture represents a chart modification. The chart elements are used to modify the formatting of a standard chart according to user preferences. The modified chart document is then displayed to the user including user desired formatting.

8 Claims, 5 Drawing Sheets

(56) References Cited

U.S. PATENT DOCUMENTS

| | | | |
|---|---|---|---|
| 5,644,737 A | 7/1997 | Tuniman et al. | 715/810 |
| 5,659,693 A | 8/1997 | Hansen et al. | |
| 5,664,127 A | 9/1997 | Anderson et al. | 715/209 |
| 5,664,208 A | 9/1997 | Pavley et al. | 715/209 |
| 5,673,403 A | 9/1997 | Brown et al. | |
| 5,721,847 A | 2/1998 | Johnson | 395/333 |
| 5,734,915 A | 3/1998 | Roewer | 395/773 |
| 5,760,768 A | 6/1998 | Gram | 345/333 |
| 5,760,773 A | 6/1998 | Berman et al. | 715/808 |
| 5,761,646 A | 6/1998 | Frid-Nielsen et al. | 705/9 |
| 5,764,960 A | 6/1998 | Perks et al. | |
| 5,778,402 A | 7/1998 | Gipson | 715/201 |
| 5,778,404 A | 7/1998 | Capps et al. | 715/531 |
| 5,787,295 A | 7/1998 | Nakao | |
| 5,793,365 A | 8/1998 | Tang et al. | |
| 5,796,393 A | 8/1998 | MacNaughton et al. | |
| 5,805,167 A | 9/1998 | Van Cruyningen | 715/808 |
| 5,812,132 A | 9/1998 | Goldstein | |
| 5,821,936 A | 10/1998 | Shaffer et al. | |
| 5,828,376 A | 10/1998 | Solimene et al. | 715/821 |
| 5,838,321 A | 11/1998 | Wolf | 345/343 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A | 12/1998 | Huemoeller et al. | 705/9 |
| 5,864,848 A | 1/1999 | Horvitz et al. | |
| 5,872,973 A | 2/1999 | Mitchell et al. | |
| 5,873,108 A | 2/1999 | Goyal et al. | |
| 5,874,956 A | 2/1999 | LaHood et al. | |
| 5,885,006 A | 3/1999 | Sheedy | 384/192 |
| 5,893,073 A | 4/1999 | Kasso et al. | |
| 5,893,125 A | 4/1999 | Shostak | |
| 5,898,436 A | 4/1999 | Stewart et al. | 345/354 |
| 5,899,979 A | 5/1999 | Miller et al. | 705/9 |
| 5,905,863 A | 5/1999 | Knowles et al. | 709/206 |
| 5,924,089 A | 7/1999 | Mocek et al. | |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | |
| 5,940,078 A | 8/1999 | Nagarajayya et al. | 345/346 |
| 5,940,847 A | 8/1999 | Fein et al. | 707/540 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,173 A | 12/1999 | Ubillos | |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,016,478 A | 1/2000 | Zhang et al. | |
| 6,018,343 A | 1/2000 | Wang et al. | 345/356 |
| 6,034,683 A | 3/2000 | Mansour et al. | 715/764 |
| 6,038,395 A | 3/2000 | Chow et al. | |
| 6,038,542 A | 3/2000 | Ruckdashel | |
| 6,043,816 A | 3/2000 | Williams et al. | |
| 6,067,087 A | 5/2000 | Krauss et al. | 715/762 |
| 6,067,551 A | 5/2000 | Brown et al. | |
| 6,073,110 A | 6/2000 | Rhodes et al. | |
| 6,073,142 A | 6/2000 | Geiger | |
| 6,085,206 A | 7/2000 | Domini et al. | 707/533 |
| 6,101,480 A | 8/2000 | Conmy et al. | 705/9 |
| 6,133,915 A | 10/2000 | Arcuri et al. | 715/779 |
| 6,154,755 A | 11/2000 | Dellert et al. | |
| 6,175,363 B1 | 1/2001 | Williams et al. | 345/334 |
| 6,188,403 B1* | 2/2001 | Sacerdoti et al. | 345/440 |
| 6,192,381 B1 | 2/2001 | Stiegemeier et al. | 715/210 |
| 6,195,094 B1 | 2/2001 | Celebiler | |
| 6,199,102 B1 | 3/2001 | Cobb | |
| 6,211,879 B1 | 4/2001 | Soohoo | 715/854 |
| 6,216,122 B1 | 4/2001 | Elson | 707/5 |
| 6,219,670 B1 | 4/2001 | Mocek et al. | 707/102 |
| 6,222,540 B1* | 4/2001 | Sacerdoti | 345/440 |
| 6,232,971 B1 | 5/2001 | Haynes | 715/800 |
| 6,236,396 B1 | 5/2001 | Jenson et al. | 715/764 |
| 6,237,135 B1 | 5/2001 | Timbol | |
| 6,239,798 B1 | 5/2001 | Ludolph et al. | |
| 6,256,628 B1 | 7/2001 | Dobson et al. | 707/6 |
| 6,269,341 B1 | 7/2001 | Redcay, Jr. | |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,307,574 B1 | 10/2001 | Ashe | |
| 6,323,883 B1 | 11/2001 | Minoura et al. | 715/784 |
| 6,326,962 B1 | 12/2001 | Szabo | |
| 6,327,046 B1 | 12/2001 | Miyamoto et al. | |
| 6,341,277 B1 | 1/2002 | Coden et al. | |
| 6,353,451 B1 | 3/2002 | Teibel et al. | 715/803 |
| 6,359,634 B1 | 3/2002 | Cragun et al. | 715/777 |
| 6,373,507 B1 | 4/2002 | Camara et al. | 345/825 |
| 6,384,849 B1 | 5/2002 | Morcos et al. | 715/810 |
| 6,385,769 B1 | 5/2002 | Lewallen | |
| 6,405,216 B1 | 6/2002 | Minnaert et al. | 707/104.1 |
| 6,424,829 B1 | 7/2002 | Kraft | 455/412.1 |
| 6,429,882 B1 | 8/2002 | Abdelnur et al. | 345/763 |
| 6,430,563 B1 | 8/2002 | Fritz et al. | |
| 6,433,801 B1 | 8/2002 | Moon et al. | 345/840 |
| 6,433,831 B1 | 8/2002 | Dinwiddie et al. | |
| 6,434,598 B1 | 8/2002 | Gish | |
| 6,442,527 B1 | 8/2002 | Worthington | |
| 6,456,304 B1 | 9/2002 | Angiulo et al. | 345/779 |
| 6,457,062 B1 | 9/2002 | Pivowar et al. | |
| 6,459,441 B1 | 10/2002 | Perroux et al. | 345/837 |
| 6,466,236 B1 | 10/2002 | Pivowar et al. | 715/835 |
| 6,469,722 B1 | 10/2002 | Kineo et al. | 345/837 |
| 6,469,723 B1 | 10/2002 | Gould | |
| 6,480,865 B1 | 11/2002 | Lee et al. | 715/523 |
| 6,484,180 B1 | 11/2002 | Lyons et al. | |
| 6,493,006 B1 | 12/2002 | Gourdol et al. | 715/825 |
| 6,493,731 B1 | 12/2002 | Jones et al. | 715/234 |
| 6,507,845 B1 | 1/2003 | Cohen et al. | |
| 6,546,417 B1 | 4/2003 | Baker | 709/206 |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,654,791 B1 | 11/2003 | Bates et al. | |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/503 |
| 6,701,513 B1 | 3/2004 | Bailey | |
| 6,707,454 B1 | 3/2004 | Barg | |
| 6,708,205 B2 | 3/2004 | Sheldon et al. | 709/206 |
| 6,721,402 B2 | 4/2004 | Usami | |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,850 B2 | 6/2004 | O'Leary | |
| 6,750,890 B1 | 6/2004 | Sugimoto | 715/838 |
| 6,785,868 B1 | 8/2004 | Raff | 715/530 |
| 6,789,107 B1 | 9/2004 | Bates et al. | |
| 6,825,859 B1 | 11/2004 | Severenuk et al. | 345/764 |
| 6,826,729 B1 | 11/2004 | Giesen et al. | 715/837 |
| 6,850,255 B2 | 2/2005 | Muschetto | 715/788 |
| 6,871,195 B2 | 3/2005 | Ryan et al. | 706/46 |
| 6,882,354 B1 | 4/2005 | Nielson | 715/784 |
| 6,895,426 B1 | 5/2005 | Cortright et al. | |
| 6,904,449 B1 | 6/2005 | Quinones | 709/203 |
| 6,906,717 B2 | 6/2005 | Couckuyt et al. | 345/440 |
| 6,915,492 B2 | 7/2005 | Kurtenbach et al. | 715/810 |
| 6,924,797 B1 | 8/2005 | MacPhail | 345/326 |
| 6,925,605 B2 | 8/2005 | Bates et al. | |
| 6,928,613 B1 | 8/2005 | Ishii | |
| 6,941,304 B2 | 9/2005 | Gainey | |
| 6,964,025 B2 | 11/2005 | Angiulo | 715/838 |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 6,990,652 B1 | 1/2006 | Parthasarathy et al. | |
| 6,990,654 B2 | 1/2006 | Carroll, Jr. | |
| 7,027,463 B2 | 4/2006 | Mathew et al. | |
| 7,032,210 B2 | 4/2006 | Alloing et al. | |

(56) References Cited

U.S. PATENT DOCUMENTS

| | | | |
|---|---|---|---|
| 7,039,596 B1 | 5/2006 | Lu | 705/8 |
| 7,046,848 B1 | 5/2006 | Olcott | 382/176 |
| 7,069,538 B1 | 6/2006 | Renshae | |
| 7,107,544 B1 | 9/2006 | Luke | 715/752 |
| 7,110,936 B2 | 9/2006 | Hiew et al. | 703/22 |
| 7,111,238 B1 | 9/2006 | Kuppusamy et al. | |
| 7,117,370 B2 | 10/2006 | Khan et al. | |
| 7,149,983 B1 | 12/2006 | Robertson et al. | |
| 7,152,207 B1 | 12/2006 | Underwood et al. | 715/526 |
| 7,181,697 B2 | 2/2007 | Tai et al. | |
| 7,188,073 B1 | 3/2007 | Tam et al. | 705/9 |
| 7,188,317 B1 | 3/2007 | Hazel | |
| 7,206,813 B2 | 4/2007 | Dunbar | |
| 7,206,814 B2 | 4/2007 | Kirsch | |
| 7,212,208 B2 * | 5/2007 | Khozai | 345/440 |
| 7,216,301 B2 | 5/2007 | Moehrle | |
| 7,219,305 B2 | 5/2007 | Jennings | |
| 7,240,323 B1 | 7/2007 | Desai et al. | |
| 7,249,325 B1 | 7/2007 | Donaldson | 715/777 |
| 7,263,668 B1 | 8/2007 | Lentz | |
| 7,290,033 B1 | 10/2007 | Goldman et al. | |
| 7,296,241 B2 | 11/2007 | Oshiro et al. | |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,356,772 B2 | 4/2008 | Brownholtz et al. | |
| 7,360,174 B2 | 4/2008 | Grossman et al. | 715/854 |
| 7,386,535 B1 | 6/2008 | Kalucha et al. | |
| 7,386,835 B1 | 6/2008 | Desai et al. | |
| 7,392,249 B1 | 6/2008 | Harris et al. | 707/5 |
| 7,395,221 B2 | 7/2008 | Doss et al. | |
| 7,395,500 B2 | 7/2008 | Whittle et al. | |
| 7,421,660 B2 | 9/2008 | Charnock et al. | |
| 7,421,690 B2 | 9/2008 | Forstall et al. | |
| 7,426,713 B2 | 9/2008 | Duggan et al. | |
| 7,469,385 B2 | 12/2008 | Harper et al. | |
| 7,472,117 B2 | 12/2008 | Dettinger et al. | |
| 7,499,907 B2 | 3/2009 | Brown et al. | |
| 7,505,954 B2 | 3/2009 | Heidloff et al. | 707/1 |
| 7,530,029 B2 | 5/2009 | Satterfield et al. | 715/779 |
| 7,555,707 B1 | 6/2009 | Labarge et al. | |
| 7,567,964 B2 | 7/2009 | Brice et al. | 707/9 |
| 7,584,253 B2 | 9/2009 | Curbow et al. | |
| 7,627,561 B2 | 12/2009 | Pell et al. | |
| 7,664,821 B1 | 2/2010 | Ancin et al. | |
| 7,703,036 B2 | 4/2010 | Satterfield et al. | |
| 7,707,255 B2 | 4/2010 | Satterfield et al. | |
| 7,711,742 B2 | 5/2010 | Bennett et al. | |
| 7,716,593 B2 | 5/2010 | Durazo et al. | |
| 7,739,259 B2 | 6/2010 | Hartwell et al. | |
| 7,747,966 B2 | 6/2010 | Leukart et al. | |
| 7,788,598 B2 | 8/2010 | Bansal et al. | |
| 7,802,199 B2 | 9/2010 | Shneerson et al. | |
| 7,831,902 B2 | 11/2010 | Sourov et al. | |
| 7,853,877 B2 | 12/2010 | Giesen et al. | |
| 7,865,868 B2 | 1/2011 | Falzone Schaw et al. | |
| 7,870,465 B2 | 1/2011 | VerSteeg | |
| 7,886,290 B2 | 2/2011 | Dhanjal et al. | |
| 7,895,531 B2 | 2/2011 | Radtke et al. | |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,201,103 B2 | 6/2012 | Dukhon et al. | |
| 8,239,882 B2 | 8/2012 | Dhanjal et al. | |
| 8,255,828 B2 | 8/2012 | Harris et al. | |
| 8,402,096 B2 | 3/2013 | Affronti et al. | |
| 8,484,578 B2 | 7/2013 | Gordner et al. | |
| 2001/0032220 A1 | 10/2001 | Ven Hoff | |
| 2001/0035882 A1 | 11/2001 | Stoakley et al. | |
| 2001/0049677 A1 | 12/2001 | Talib et al. | |
| 2002/0007380 A1 | 1/2002 | Bauchot et al. | 707/530 |
| 2002/0029247 A1 | 3/2002 | Kawamoto | |
| 2002/0037754 A1 | 3/2002 | Hama et al. | 455/566 |
| 2002/0052721 A1 | 5/2002 | Ruff et al. | 703/1 |
| 2002/0052880 A1 | 5/2002 | Fruensgaard et al. | |
| 2002/0054128 A1 | 5/2002 | Lau et al. | |
| 2002/0070977 A1 | 6/2002 | Morcos et al. | 345/810 |
| 2002/0073156 A1 | 6/2002 | Newman | |
| 2002/0075330 A1 | 6/2002 | Rosenzweig et al. | 345/854 |
| 2002/0078143 A1 | 6/2002 | DeBoor et al. | 709/203 |
| 2002/0083054 A1 | 6/2002 | Peltonen et al. | |
| 2002/0091697 A1 | 7/2002 | Huang et al. | |
| 2002/0091739 A1 | 7/2002 | Ferlitsch | 707/526 |
| 2002/0122071 A1 | 9/2002 | Camara et al. | 715/810 |
| 2002/0123984 A1 | 9/2002 | Prakash | |
| 2002/0133557 A1 | 9/2002 | Winarski | 709/207 |
| 2002/0135621 A1 | 9/2002 | Angiulo et al. | 345/838 |
| 2002/0140731 A1 | 10/2002 | Subramaniam et al. | 345/762 |
| 2002/0140740 A1 | 10/2002 | Chen | 715/810 |
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0158876 A1 | 10/2002 | Janssen | |
| 2002/0163538 A1 | 11/2002 | Shteyn | 345/752 |
| 2002/0175938 A1 | 11/2002 | Hackworth | |
| 2002/0175955 A1 | 11/2002 | Gourdol et al. | 345/821 |
| 2002/0186257 A1 | 12/2002 | Cadiz et al. | |
| 2002/0196293 A1 | 12/2002 | Suppan et al. | 345/853 |
| 2003/0005051 A1 | 1/2003 | Gottlieb | |
| 2003/0009455 A1 | 1/2003 | Carlson et al. | 707/6 |
| 2003/0011564 A1 | 1/2003 | Ushino et al. | |
| 2003/0011638 A1 | 1/2003 | Chung | 345/808 |
| 2003/0011639 A1 | 1/2003 | Webb | 345/808 |
| 2003/0014421 A1 | 1/2003 | Jung | |
| 2003/0014490 A1 | 1/2003 | Bates et al. | 709/206 |
| 2003/0022700 A1 | 1/2003 | Wang | |
| 2003/0025732 A1 | 2/2003 | Prichard | |
| 2003/0025737 A1 | 2/2003 | Breinberg | |
| 2003/0035917 A1 | 2/2003 | Hyman | 428/67 |
| 2003/0038832 A1 | 2/2003 | Sobol | 715/722 |
| 2003/0043200 A1 | 3/2003 | Faieta et al. | |
| 2003/0043211 A1 | 3/2003 | Kremer et al. | 715/838 |
| 2003/0046528 A1 | 3/2003 | Haitani et al. | |
| 2003/0050986 A1 | 3/2003 | Matthews et al. | |
| 2003/0066025 A1 | 4/2003 | Garner et al. | 715/500 |
| 2003/0069892 A1 | 4/2003 | Hind et al. | |
| 2003/0069900 A1 | 4/2003 | Hind et al. | |
| 2003/0070143 A1 | 4/2003 | Maslov | 715/513 |
| 2003/0084035 A1 | 5/2003 | Emerick | |
| 2003/0093490 A1 | 5/2003 | Yamamoto et al. | 709/213 |
| 2003/0097361 A1 | 5/2003 | Huang et al. | 707/10 |
| 2003/0097640 A1 | 5/2003 | Abrams et al. | |
| 2003/0098891 A1 | 5/2003 | Molander | 715/841 |
| 2003/0106024 A1 | 6/2003 | Silverbrook et al. | |
| 2003/0110191 A1 | 6/2003 | Handsaker et al. | 707/503 |
| 2003/0112278 A1 | 6/2003 | Driskell | 715/788 |
| 2003/0135825 A1 | 7/2003 | Gertner et al. | |
| 2003/0156140 A1 | 8/2003 | Watanabe | |
| 2003/0160821 A1 | 8/2003 | Yoon | |
| 2003/0163455 A1 | 8/2003 | Dettinger et al. | 707/3 |
| 2003/0163537 A1 | 8/2003 | Rohall et al. | |
| 2003/0167310 A1 | 9/2003 | Moody et al. | 709/206 |
| 2003/0169284 A1 | 9/2003 | Dettinger et al. | 715/708 |
| 2003/0195937 A1 | 10/2003 | Kircher et al. | 709/207 |
| 2003/0206646 A1 | 11/2003 | Brackett | 382/128 |
| 2003/0218611 A1 | 11/2003 | Ben-Tovim et al. | 345/440 |
| 2003/0226106 A1 | 12/2003 | McKellar et al. | 715/513 |
| 2003/0227487 A1 | 12/2003 | Hugh | 715/777 |
| 2003/0233419 A1 | 12/2003 | Beringer | 709/206 |
| 2004/0002941 A1 | 1/2004 | Thorne et al. | |
| 2004/0003351 A1 | 1/2004 | Sommerer et al. | 715/251 |
| 2004/0006570 A1 | 1/2004 | Gelb et al. | |
| 2004/0012633 A1 | 1/2004 | Helt | 715/764 |
| 2004/0021647 A1 | 2/2004 | Iwema et al. | |
| 2004/0024824 A1 | 2/2004 | Ferguson et al. | |
| 2004/0030993 A1 | 2/2004 | Hong Huey et al. | |
| 2004/0056894 A1 | 3/2004 | Zaika et al. | 345/762 |
| 2004/0083432 A1 | 4/2004 | Kawamura et al. | |
| 2004/0088359 A1 | 5/2004 | Simpson | |
| 2004/0090315 A1 | 5/2004 | Mackjust et al. | 340/426.13 |
| 2004/0100504 A1 | 5/2004 | Sommer | 345/810 |
| 2004/0100505 A1 | 5/2004 | Cazier | |

(56) References Cited

U.S. PATENT DOCUMENTS

| | | |
|---|---|---|
| 2004/0107197 A1 | 6/2004 | Shen et al. .......... 707/9 |
| 2004/0109025 A1 | 6/2004 | Hullot et al. .......... 345/764 |
| 2004/0109033 A1 | 6/2004 | Vienneau et al. .......... 345/863 |
| 2004/0117451 A1 | 6/2004 | Chung |
| 2004/0119755 A1 | 6/2004 | Guibourge |
| 2004/0119760 A1 | 6/2004 | Grossman et al. .......... 715/854 |
| 2004/0122789 A1 | 6/2004 | Ostertag et al. |
| 2004/0125142 A1 | 7/2004 | Mock et al. |
| 2004/0128275 A1 | 7/2004 | Moehrle |
| 2004/0133854 A1 | 7/2004 | Black .......... 715/517 |
| 2004/0142720 A1 | 7/2004 | Smethers .......... 455/550.1 |
| 2004/0153968 A1 | 8/2004 | Ching et al. |
| 2004/0164983 A1* | 8/2004 | Khozai .......... 345/440 |
| 2004/0168153 A1 | 8/2004 | Marvin .......... 717/120 |
| 2004/0186775 A1 | 9/2004 | Margiloff et al. .......... 705/14 |
| 2004/0189694 A1 | 9/2004 | Kurtz et al. |
| 2004/0192440 A1 | 9/2004 | Evans et al. |
| 2004/0205536 A1 | 10/2004 | Newman et al. |
| 2004/0212640 A1 | 10/2004 | Mann |
| 2004/0215612 A1 | 10/2004 | Brody |
| 2004/0221234 A1 | 11/2004 | Imai .......... 715/256 |
| 2004/0230508 A1 | 11/2004 | Minnis et al. .......... 705/35 |
| 2004/0230906 A1 | 11/2004 | Pik et al. .......... 715/522 |
| 2004/0236796 A1 | 11/2004 | Bhatt et al. |
| 2004/0239700 A1 | 12/2004 | Baschy .......... 715/781 |
| 2004/0240902 A1 | 12/2004 | Dalal et al. |
| 2004/0243938 A1 | 12/2004 | Weise et al. .......... 715/205 |
| 2004/0260756 A1 | 12/2004 | Forstall et al. |
| 2004/0261013 A1 | 12/2004 | Wynn et al. |
| 2004/0268231 A1 | 12/2004 | Tunning .......... 715/513 |
| 2004/0268270 A1 | 12/2004 | Hill et al. |
| 2005/0004989 A1 | 1/2005 | Satterfield et al. |
| 2005/0004990 A1 | 1/2005 | Durazo et al. .......... 709/206 |
| 2005/0005235 A1 | 1/2005 | Satterfield et al. |
| 2005/0005249 A1 | 1/2005 | Hill et al. .......... 715/963 |
| 2005/0010871 A1 | 1/2005 | Ruthfield et al. .......... 715/712 |
| 2005/0015361 A1 | 1/2005 | Payton et al. |
| 2005/0021504 A1 | 1/2005 | Atchison .......... 707/3 |
| 2005/0022116 A1 | 1/2005 | Bowman et al. .......... 715/513 |
| 2005/0033614 A1 | 2/2005 | Lettovsky et al. |
| 2005/0039142 A1 | 2/2005 | Jalon et al. |
| 2005/0043015 A1 | 2/2005 | Muramatsu |
| 2005/0044500 A1 | 2/2005 | Orimoto et al. .......... 715/706 |
| 2005/0055449 A1 | 3/2005 | Rappold, III |
| 2005/0057584 A1 | 3/2005 | Gruen et al. .......... 345/752 |
| 2005/0060337 A1 | 3/2005 | Chou et al. |
| 2005/0086135 A1 | 4/2005 | Lu .......... 705/30 |
| 2005/0091576 A1 | 4/2005 | Relyea et al. |
| 2005/0097465 A1 | 5/2005 | Giesen et al. |
| 2005/0108348 A1 | 5/2005 | Lee |
| 2005/0114778 A1 | 5/2005 | Branson et al. |
| 2005/0117179 A1 | 6/2005 | Ito et al. |
| 2005/0132010 A1 | 6/2005 | Muller |
| 2005/0132053 A1 | 6/2005 | Roth et al. |
| 2005/0138576 A1 | 6/2005 | Baumert et al. .......... 715/862 |
| 2005/0144241 A1 | 6/2005 | Stata et al. |
| 2005/0144284 A1 | 6/2005 | Ludwig et al. |
| 2005/0144568 A1 | 6/2005 | Gruen et al. |
| 2005/0172262 A1 | 8/2005 | Lalwani .......... 717/109 |
| 2005/0177789 A1 | 8/2005 | Abbar et al. |
| 2005/0183008 A1 | 8/2005 | Crider et al. .......... 715/517 |
| 2005/0185920 A1 | 8/2005 | Harper et al. |
| 2005/0203975 A1 | 9/2005 | Jindal et al. |
| 2005/0216863 A1 | 9/2005 | Schumacher et al. .......... 715/827 |
| 2005/0223066 A1 | 10/2005 | Buchheit et al. |
| 2005/0223329 A1 | 10/2005 | Schwartz et al. .......... 715/711 |
| 2005/0234910 A1 | 10/2005 | Buchheit |
| 2005/0251757 A1 | 11/2005 | Farn |
| 2005/0256867 A1 | 11/2005 | Walther et al. .......... 707/5 |
| 2005/0278656 A1 | 12/2005 | Goldthwaite et al. .......... 715/810 |
| 2005/0289109 A1 | 12/2005 | Arrouye et al. |
| 2005/0289156 A1 | 12/2005 | Maryka et al. .......... 707/100 |
| 2005/0289158 A1 | 12/2005 | Weiss et al. |
| 2006/0015816 A1 | 1/2006 | Kuehner et al. |
| 2006/0020962 A1 | 1/2006 | Stark .......... 725/32 |
| 2006/0026033 A1 | 2/2006 | Brydon et al. |
| 2006/0026213 A1 | 2/2006 | Yaskin et al. |
| 2006/0026242 A1 | 2/2006 | Kuhlmann |
| 2006/0036580 A1 | 2/2006 | Stata .......... 707/3 |
| 2006/0036945 A1 | 2/2006 | Radtke et al. .......... 715/708 |
| 2006/0036946 A1 | 2/2006 | Radtke et al. |
| 2006/0036950 A1 | 2/2006 | Himberger et al. |
| 2006/0036964 A1 | 2/2006 | Satterfield et al. |
| 2006/0036965 A1 | 2/2006 | Harris et al. .......... 715/777 |
| 2006/0041545 A1 | 2/2006 | Heidloff et al. .......... 707/4 |
| 2006/0047644 A1 | 3/2006 | Bocking et al. |
| 2006/0053383 A1 | 3/2006 | Gauthier et al. |
| 2006/0064434 A1 | 3/2006 | Gilbert et al. |
| 2006/0069604 A1 | 3/2006 | Leukart et al. |
| 2006/0069686 A1 | 3/2006 | Beyda et al. |
| 2006/0080303 A1 | 4/2006 | Sargent et al. |
| 2006/0095865 A1 | 5/2006 | Rostom .......... 715/810 |
| 2006/0101051 A1 | 5/2006 | Carr et al. .......... 707/102 |
| 2006/0101350 A1 | 5/2006 | Scott .......... 715/779 |
| 2006/0111931 A1 | 5/2006 | Johnson et al. .......... 705/1 |
| 2006/0117249 A1 | 6/2006 | Hu et al. .......... 715/255 |
| 2006/0117302 A1 | 6/2006 | Mercer et al. |
| 2006/0129937 A1 | 6/2006 | Shafron .......... 715/733 |
| 2006/0132812 A1 | 6/2006 | Barnes et al. |
| 2006/0155689 A1 | 7/2006 | Blakeley et al. |
| 2006/0161849 A1 | 7/2006 | Miller et al. |
| 2006/0161863 A1 | 7/2006 | Gallo |
| 2006/0168522 A1 | 7/2006 | Bala |
| 2006/0173824 A1 | 8/2006 | Bensky .......... 707/3 |
| 2006/0173961 A1 | 8/2006 | Turski et al. |
| 2006/0218500 A1 | 9/2006 | Sauve et al. .......... 715/767 |
| 2006/0242557 A1 | 10/2006 | Nortis, III .......... 715/234 |
| 2006/0242575 A1 | 10/2006 | Winser |
| 2006/0248012 A1 | 11/2006 | Kircher et al. |
| 2006/0259449 A1 | 11/2006 | Betz et al. |
| 2006/0271869 A1 | 11/2006 | Thanu et al. |
| 2006/0271910 A1 | 11/2006 | Burcham et al. |
| 2006/0282817 A1 | 12/2006 | Darst et al. |
| 2006/0294452 A1 | 12/2006 | Matsumoto .......... 715/236 |
| 2006/0294526 A1 | 12/2006 | Hambrick et al. |
| 2006/0294528 A1 | 12/2006 | Lund et al. |
| 2007/0006206 A1 | 1/2007 | Dhanjal et al. |
| 2007/0011258 A1 | 1/2007 | Koo |
| 2007/0033250 A1 | 2/2007 | Levin et al. |
| 2007/0050182 A1 | 3/2007 | Sneddon et al. |
| 2007/0050401 A1 | 3/2007 | Young et al. .......... 707/102 |
| 2007/0055936 A1 | 3/2007 | Dhanjal et al. |
| 2007/0055943 A1 | 3/2007 | McCormack et al. |
| 2007/0061306 A1 | 3/2007 | Pell et al. |
| 2007/0061307 A1 | 3/2007 | Hartwell et al. |
| 2007/0061308 A1 | 3/2007 | Hartwell et al. |
| 2007/0061738 A1 | 3/2007 | Taboada et al. |
| 2007/0094230 A1 | 4/2007 | Subramaniam et al. |
| 2007/0106951 A1 | 5/2007 | McCormack et al. |
| 2007/0124696 A1 | 5/2007 | Mullender |
| 2007/0143662 A1 | 6/2007 | Carlson et al. |
| 2007/0143671 A1 | 6/2007 | Paterson et al. .......... 715/209 |
| 2007/0180040 A1 | 8/2007 | Etgen et al. |
| 2007/0185826 A1 | 8/2007 | Brice et al. .......... 707/1 |
| 2007/0203991 A1 | 8/2007 | Fisher et al. |
| 2007/0240057 A1 | 10/2007 | Satterfield et al. .......... 715/705 |
| 2007/0260996 A1 | 11/2007 | Jakobson .......... 715/781 |
| 2007/0266017 A1 | 11/2007 | Held et al. |
| 2007/0279417 A1 | 12/2007 | Garg et al. .......... 345/440 |
| 2007/0282956 A1 | 12/2007 | Staats |
| 2007/0300168 A1 | 12/2007 | Bosma et al. .......... 715/820 |
| 2008/0005689 A1 | 1/2008 | Singh |
| 2008/0034304 A1 | 2/2008 | Feuerbacher et al. .......... 715/764 |
| 2008/0040682 A1 | 2/2008 | Sorenson et al. .......... 715/777 |
| 2008/0052670 A1 | 2/2008 | Espinosa et al. |
| 2008/0077571 A1 | 3/2008 | Harris et al. .......... 707/5 |
| 2008/0104505 A1 | 5/2008 | Keohane et al. |
| 2008/0109787 A1 | 5/2008 | Wang et al. |
| 2008/0134138 A1 | 6/2008 | Chamieh et al. |
| 2008/0141242 A1 | 6/2008 | Shapiro |
| 2008/0155555 A1 | 6/2008 | Kwong |
| 2008/0178110 A1 | 7/2008 | Hill et al. .......... 715/771 |
| 2008/0244440 A1 | 10/2008 | Bailey |
| 2009/0007003 A1 | 1/2009 | Dukhon et al. .......... 715/778 |

(56) References Cited

U.S. PATENT DOCUMENTS

| | | | |
|---|---|---|---|
| 2009/0012984 A1 | 1/2009 | Ravid et al. | |
| 2009/0083656 A1 | 3/2009 | Dukhon et al. | 715/781 |
| 2009/0100009 A1 | 4/2009 | Karp | |
| 2009/0106375 A1 | 4/2009 | Carmel et al. | |
| 2009/0152349 A1 | 6/2009 | Bonev et al. | |
| 2009/0158173 A1 | 6/2009 | Palahnuk et al. | |
| 2009/0217192 A1 | 8/2009 | Dean et al. | 715/777 |
| 2009/0222763 A1 | 9/2009 | Dukhon et al. | 715/808 |
| 2009/0319619 A1 | 12/2009 | Affronti | |
| 2009/0319911 A1 | 12/2009 | McCann | |
| 2010/0011310 A1 | 1/2010 | Rainisto | |
| 2010/0060645 A1 | 3/2010 | Garg et al. | |
| 2010/0180226 A1 | 7/2010 | Satterfield et al. | |
| 2010/0191818 A1 | 7/2010 | Satterfield et al. | |
| 2010/0211889 A1 | 8/2010 | Durazo et al. | |
| 2010/0223575 A1 | 9/2010 | Leukart et al. | |
| 2010/0293470 A1 | 11/2010 | Zhao et al. | |
| 2011/0072396 A1 | 3/2011 | Giesen et al. | |
| 2011/0138273 A1 | 6/2011 | Radtke et al. | |
| 2011/0296322 A1 | 12/2011 | Dhanjal et al. | |
| 2012/0179993 A1 | 7/2012 | Himberger et al. | |
| 2012/0215866 A1 | 8/2012 | Satterfield et al. | |
| 2012/0324394 A1 | 12/2012 | Harris et al. | |
| 2013/0014048 A1 | 1/2013 | Satterfield et al. | |
| 2013/0159879 A1 | 6/2013 | Affronti et al. | |

FOREIGN PATENT DOCUMENTS

| | | | |
|---|---|---|---|
| CN | 1746914 | 3/2006 | |
| CN | 101243439 | 6/2012 | |
| CN | 102067166 B | 6/2013 | |
| CN | 102317897 B | 7/2013 | |
| EP | 0 910 007 | 4/1999 | |
| EP | EP 0 910 007 | 4/1999 | |
| EP | 1 077 405 A2 | 2/2001 | |
| EP | 1 104 151 | 5/2001 | |
| EP | 1 672 518 | 6/2001 | |
| EP | EP 1 672 518 | 6/2001 | |
| EP | 1 223 503 | 7/2002 | |
| EP | 1 376 337 | 2/2004 | |
| EP | 1 462 999 A2 | 9/2004 | |
| EP | 1 542 133 A2 | 6/2005 | |
| EP | 1564652 | 8/2005 | |
| EP | 1628197 | 2/2006 | |
| EP | 1628198 | 2/2006 | |
| EP | 1628199 | 2/2006 | |
| EP | 1645972 | 4/2006 | |
| EP | 1 835 434 A1 | 9/2007 | |
| EP | 1915001 | 4/2008 | |
| GB | 2329813 | 3/1999 | |
| GB | 2 391 148 | 1/2004 | |
| ID | P0027717 | 3/2011 | |
| ID | P0027754 | 3/2011 | |
| ID | P0029297 | 10/2011 | |
| JP | 03-043824 | 2/1991 | |
| JP | 04-186425 | 7/1992 | |
| JP | 04-312186 | 11/1992 | |
| JP | 05-204579 | 8/1993 | |
| JP | 06-052282 | 2/1994 | |
| JP | 06-342357 | 12/1994 | |
| JP | 10-074217 | 3/1998 | |
| JP | 10-326171 | 12/1998 | |
| JP | 11-039292 | 2/1999 | |
| JP | 11-175258 | 7/1999 | |
| JP | 11-259200 | 9/1999 | |
| JP | 2001-034775 | 2/2001 | |
| JP | 2001-503893 | 3/2001 | |
| JP | 2001-109673 | 4/2001 | |
| JP | 2001-222477 | 8/2001 | |
| JP | 2001-337944 | 12/2001 | |
| JP | 2003-015719 | 1/2003 | |
| JP | 2003-101768 | 4/2003 | |
| JP | 2003-0198630 | 7/2003 | |
| JP | 2003-216427 | 7/2003 | |
| JP | 2003-256258 | 9/2003 | |
| JP | 2003-256302 | 9/2003 | |
| JP | 2003-308145 | 10/2003 | |
| JP | 2004-078512 | 3/2004 | |
| JP | 2004-086893 | 3/2004 | |
| JP | 2004-102803 | 3/2004 | |
| JP | 2004-512578 | 4/2004 | |
| JP | 2004-145569 | 5/2004 | |
| JP | 2004-159261 | 6/2004 | |
| JP | 2004-185464 | 7/2004 | |
| JP | 2004-318842 | 11/2004 | |
| JP | 2004-342115 | 12/2004 | |
| JP | 2005-025550 | 1/2005 | |
| JP | 2005-31995 | 2/2005 | |
| JP | 2005-032041 | 2/2005 | |
| JP | 2005-182353 | 7/2005 | |
| JP | 2005-236089 | 9/2005 | |
| JP | 2005-352849 | 12/2005 | |
| JP | 2007-280180 | 10/2007 | |
| JP | 2007-531165 | 11/2007 | |
| JP | 2008-047067 | 2/2008 | |
| JP | 4832024 | 9/2011 | |
| JP | 5021185 | 6/2012 | |
| JP | 5079701 | 9/2012 | |
| JP | 5139984 | 11/2012 | |
| JP | 5190452 | 2/2013 | |
| JP | 5193042 | 2/2013 | |
| JP | 5221757 | 3/2013 | |
| JP | 5266384 | 5/2013 | |
| KR | 10-2003-0070685 | 2/2003 | |
| KR | 10-2005-0023805 A | 3/2005 | |
| KR | 10-2005-0036702 A | 4/2005 | |
| KR | 10-1130421 | 3/2012 | |
| KR | 10-1149960 | 5/2012 | |
| KR | 10-1149990 | 5/2012 | |
| KR | 10-1159334 | 6/2012 | |
| KR | 10-1238559 | 2/2013 | |
| KR | 10-1298338 | 8/2013 | |
| KR | 10-1298461 | 8/2013 | |
| MY | 146456 | 8/2012 | |
| MY | 147334 | 7/2013 | |
| PH | 1-2005-000404 | 8/2011 | |
| RU | 2005/120362 | 1/2007 | |
| RU | 2322687 | 4/2008 | |
| RU | 2328034 | 6/2008 | |
| TW | 460839 | 10/2001 | |
| TW | 490652 | 6/2002 | |
| TW | 2003-05097 | 10/2003 | |
| TW | I368852 | 7/2012 | |
| TW | I368852 | 3/2013 | |
| TW | I389043 | 3/2013 | |
| TW | I401577 | 7/2013 | |
| WO | 92/21091 | 11/1992 | |
| WO | 94/20921 | 9/1994 | |
| WO | 96/10231 | 4/1996 | |
| WO | 96/39654 | 12/1996 | |
| WO | 98/20410 | 5/1998 | |
| WO | WO 99/04353 A1 | 1/1999 | |
| WO | WO 99/27495 | 6/1999 | |
| WO | 01/55894 | 8/2001 | |
| WO | WO 02/091162 A3 | 11/2002 | |
| WO | WO 03/003240 A2 | 9/2003 | |
| WO | WO03098500 | 11/2003 | G06F 17/60 |
| WO | WO 2007/033159 A1 | 3/2007 | |
| WO | WO 2007/027737 A1 | 8/2007 | |
| WO | 2008/027477 | 3/2008 | |
| WO | WO 2008/121718 A1 | 9/2008 | |
| WO | 2009-158151 | 12/2009 | |
| WO | 2009-158171 | 12/2009 | |
| WO | 2009-158172 | 12/2009 | |
| ZA | 2010/07809 | 2/2012 | |
| ZA | 2010/07810 | 2/2012 | |
| ZA | 2011/04850 | 12/2012 | |

OTHER PUBLICATIONS

Lisa K. Averett; Joshua R. Knisley; Mark A. Marvin; Haiti: Projecting Tactical Network and Systems Management; 1995 IEEE pp. 906-910.*

(56) References Cited

OTHER PUBLICATIONS

"Creating Charts: An Introductcion," *Excel®for Chemists: A Comprehensive Guide*, E. Joseph Billo. http://www.ahut.edu.cn/yxsz/ahkl/Teaching/Excel%20for%20Chemists/Ch02.pdf.
Marsh, Bruce, Integrating Spreadsheet Templates and Data Analysis Into Fluid Power Instruction, *Journal of Industrial Technology*, vol. 16, No. 4, Aug. 2000-Oct. 2000. http://www.nait.org/jit/Articles/marsh071900.pdf.
International Search Report dated Nov. 27, 2007 in PCT/US2007/012573, 9 pages.
"Primary Windows," http://www-03.ibm.com/servers/eserver/iseries/navigator/guidelines/primary.html, 23 pgs.
Marshall School of Business: "Workshop IV—Calendar," http://www.marshall.usc.edu/computing/PDF_Files/Outlook/Workshop4, PDF, Apr. 10, 2000, pp. 1-14.
"Microsoft Outlook 2000: Introduction to Calendar," Version 2002.03.25, http://www.uakron.edu/its/learning/training/docs/Calendar032502.pdf, Mar. 25, 2002, pp. 1-52.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Gina Danielle Venolia et al., Understanding Sequence and Reply Relationships within Email Conversations: A Mixed-Model Visualization, CHI 2003, Apr. 5-10, 2003, vol. 5, Issue No. 1, pp. 361-368.
Agarwal, Vikash K., "Creating a Visually Arresting User-Interface: $A_3D$ Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
"Convert to Word 2007," http://www.regencytraining.com/word-2007-conversion.html, *Regency Training and Consulting*, 2 pages. (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/TWC.htm, 6 pages (Feb. 13, 2007).
Krill, P., "Microsoft's Ribbon Interface Draws Frowns, Smiles," *Info World*, http://www.infoworld.com/article/08/03/04/10NF-microsoft-fluentui_1.html, 3 pages (Mar. 4, 2008).
Screendumps—Microsoft Office, Microsoft Corporation, Microsoft Office Professional Edition 2003, 13 pages.
Australian Search Report dated Jan. 16, 2007 cited in Singapore Application No. 200504474-8, pp. 1-8.
PCT Search Report dated Feb. 6, 2007 cited in International Application No. PCT/US2006/035467, pp. 1-10.
PCT Search Report dated Feb. 26, 2007 cited in International Application No. PCT/US2006/034993, pp. 1-11.
European Communicated dated Oct. 20, 2005 cited in EP Application No. 04102463.0-2211 PCT/, pp. 1-4.
Australian Written Opinion/Search Report cited in Singapore Application No. 200505257-6 mailed Feb. 12, 2007, pp. 1-6.
International Search Report dated Oct. 17, 2007 cited in International Application No. PCT/US2006/012724, pp. 1-11.
Chinese First Office Action dated Mar. 21, 2008 cited in Appln No. 200510092146.4, pp. 1-21.
Chinese First Office Action dated Mar. 21, 2008 cited in Appln No. 200510092139.4, pp. 1-25.
Chinese First Office Action dated Apr. 11, 2008 cited in Appln No. 200510092141.1, pp. 1-21.
Chinese First Office Action dated Apr. 18, 2008 cited in Appln No. 200510092142.6., pp. 1-22.
Philippines Examiner's Action dated Apr. 21, 2008 cited in Appln No. 1-2005-000405, pp. 1.
Philippines Examiner's Action dated Apr. 21, 2008 cited in Appln No. 1-2005-000406, pp. 1.
Chinese First Office Action dated May 23, 2008 cited in Appln No. 200510089514.X., pp. 1-16.
European Summons to Attend Oral Proceedings dated Jun. 23, 2008 cited in Appln No. 04102463.9., pp. 1.
Philippines Examiner's Action dated Jul. 31, 2008 cited in Appln No. 12005000495., pp. 1.
Philippines Examiner's Action dated Aug. 19, 2008 cited in Appln No. 12005000405., pp. 1.
Philippines Examiner's Action dated Sep. 12, 2008 cited in Appln No. 1200500406., pp. 1.
Chinese Second Office Action dated Oct. 10, 2008 cited in Appln No. 200510092141.1., pp. 1-22.
Chinese Second Office Action dated Oct. 17, 2008 cited in Appln No. 200510092139.4., pp. 1-17.
Chinese Second Office Action dated Jul. 3, 2009 cited in Appln No. 200680018095.3, pp. 1-14.
Chinese Second Office Action dated Nov. 21, 2008 cited in Appln No. 200510089514.X., pp. 1-14.
Chilean Office Action dated Nov. 27, 2008 cited in Appln No. 1768-2005, pp. 1-10.
Chilean Office Action dated Sep. 23, 2008 cited in Appln No. 1770-2005, pp. 1-10.
Chilean Office Action dated Nov. 27, 2008 cited in Appln No. 1769-2005, pp. 1-11.
Chilean Second Office Action dated Mar. 4, 2009 cited in Appln No. 2512-2005, pp. 1-12.
Supplementary European Search Report dated May 28, 2009 cited in EP Application No. 07795391.7-1225, pp. 1-7.
U.S. Official Action dated Nov. 25, 2008 cited in U.S. Appl. No. 11/154,278., pp. 1-43.
Russian Office Action dated Jul. 21, 2009 cited in Appln No. 2005125837/09(029011), pp. 1-12.
Russian Office Action dated Jul. 30, 2009 cited in Appln No. 2005125831/09(029005), pp. 1-17.
European Search Report dated Sep. 7, 2009 cited in EP Application No. 09006972.5-2211, pp. 1-5.
European Communication dated Sep. 14, 2009 cited in Appln. No. 07795391.7-1225, pp. 1-5.
U.S. Official Action dated Apr. 29, 2008 cited in U.S. Appl. No. 10/955,941, pp. 1-21.
U.S. Official Action dated May 28, 2008 cited in U.S. Appl. No. 10/982,073, pp. 1-15.
U.S. Official Action dated Jun. 19, 2008 cited in U.S. Appl. No. 10/851,506, pp. 1-39.
U.S. Official Action dated Jun. 20, 2008 cited in U.S. Appl. No. 10/955,928., pp. 1-34.
U.S. Official Action dated Jul. 17, 2008 cited in U.S. Appl. No. 10/955,940., pp. 1-26.
U.S. Official Action dated Jul. 24, 2008 cited in U.S. Appl. No. 11/151,686., pp. 1-30.
U.S. Official Action dated Oct. 28, 2008 cited in U.S. Appl. No. 11/151,686., pp. 1-19.
U.S. Official Action dated Dec. 11, 2008 in U.S. Appl. No. 10/982,073., pp. 1-12.
Chilean Office Action dated Mar. 28, 2008 cited in Appln No. 1770-05, pp. 1-10.
Chilean Second Office Action dated Dec. 4, 2009 cited in Appln No. 1768-2005, pp. 1-6.
PCT Search Report and Written Opinion dated Dec. 29, 2009 cited in International Application No. PCT/US2009/046344, pp. 1-11.
U.S. Official Action dated Jan. 20, 2010 in U.S. Appl. No. 10/955,967, 1-26.
U.S. Official Action dated Jan. 25, 20010 in U.S. Appl. No. 10/982,073, pp. 1-12.
Microsoft Press, Microsoft Computer Dictionary, Microsoft Press, Fifth Edition, pp. 374, 382.
Riggsby, McCoy, Haberman and Falciani, "Mastering Lotus Notes and Domino 6." 2003, pp. 18, 22, 33-35, 47, 122, 123, 215-241, 378.
PCT Search Report and Written Opinion dated Nov. 30, 2009 cited in International Application No. PCT/US2009/046341, pp. 1-11.
Chilean Second Office Action dated Nov. 4, 2009 cited in Appln No. 1770-2005, pp. 1-7.
Chilean Second Office Action dated Jan. 29, 2010 cited in Appln No. 1769-2005, pp. 1-7.

(56) References Cited

OTHER PUBLICATIONS

Philippines Examiner's Action dated Mar. 11, 2010 cited in Appln No. 1-2005-000405, p. 1.
Chinese Office Action dated Nov. 27, 2009 cited in Appln No. 200680033212.3, pp. 1-8.
Chinese Office Action dated Jan. 22, 2010 cited in Appln No. 200680032564.7, pp. 1-7.
Russian Office Action dated Oct. 30, 2009 cited in Appln No. 2005125837/09(029011), pp. 1-5.
Russian Office Action dated Dec. 28, 2009 cited in Appln No. 2005125836/09(029010), pp. 1-2.
U.S. Official Action dated Jan. 20, 2010 in U.S. Appl. No. 10/955,967, pp. 1-26.
U.S. Appl. No. 12/753,923, filed Apr. 5, 2010 entitled "Automatic Grouping of Electronic Mail", 1-49.
Chinese Third Office Action dated Feb. 12, 2010 cited in Appln No. 200510092142.6, pp. 1-7.
Chinese Office Action dated Mar. 11, 2010 cited in Appln No. 200780020312.7, pp. 1-8.
Australian Office Action dated Mar. 25, 2010 cited in Appln No. 2005203411, pp. 1-2.
Australian Office Action dated Mar. 25, 2010 cited in Appln No. 2005203412, pp. 1-2.
Australian Office Action dated Mar. 26, 2010 cited in Appln No. 2005203409, pp. 1.
Australian Office Action dated Apr. 8, 2010 cited in Appln No. 2005203410, pp. 1-2.
U.S. Official Action dated Apr. 15, 2010 in U.S. Appl. No. 11/823,999, pp. 1-32.
U.S. Official Action dated May 5, 2010 in U.S. Appl. No. 10/851,506, pp. 1-32.
U.S. Appl. No. 12/769,787, filed Apr. 29, 2010 entitled "Conversation Grouping of Electronic Mail Records", pp. 1-32.
U.S. Appl. No. 12/777,287, filed May 11, 2010 entitled "User Interface for Providing Task Management and Calendar Information", pp. 1-31.
Clifton, The Application Automation layer—Using XML to Dynamically General GUI Elements—forms and controls, The Code Project, Jun. 2003, pp. 1-37.
PCT Written Opinion and Search Report dated Jan. 9, 2007 cited in International Application No. PCT/US2006/033809, pp. 1-5.
European Office Action mailed Mar. 9, 2009, Application No. 06790087.8, pp. 1-5.
Australian Office Action dated May 28, 2010 cited in Appln No. 2005202717, pp. 2.
U.S. Official Action dated Sep. 15, 2009 in U.S. Appl. No. 11/217,071, pp. 1-23.
U.S. Official Action dated Mar. 30, 2010 in U.S. Appl. No. 11/217,071, pp. 1-33.
U.S. Official Action dated May 25, 2010 in U.S. Appl. No. 10/607,020, pp. 1-22.
U.S. Official Action dated Jun. 3, 2010 in U.S. Appl. No. 12/028,797, pp. 1-21.
Screen Shot of MS_Office_2003; (Microsoft Corporation, Microsoft Office Professional Edition 2003; 6 pages).
Chinese Second Office Action dated Jul. 6, 2010 cited in Appln No. 200680033212.3, pp. 1-6.
U.S. Official Action dated Jun. 22, 2010 in U.S. Appl. No. 11/430,562, pp. 1-36.
U.S. Official Action dated Jun. 23, 2010 in U.S. Appl. No. 10/955,940, pp. 1-19.
U.S. Official Action dated Jul. 1, 2010 in U.S. Appl. No. 11/782,059, pp. 1-24.
U.S. Official Action dated Jul. 6, 2010 in U.S. Appl. No. 10/955,967, pp. 1-45.
Clifton, The Application Automation layer—Using XML to Dynamically Generale GUI Elements—forms and controls, The Code Project, Jun. 2003, pp. 1-37.
Halvorson et al., Microsoft Office Professional Official Manual, Aug. 20, 2002, 10 pgs.
Mexican Office Action dated Aug. 12, 2010 cited in Appln No. 2005/008354, pp. 1-6.
U.S. Official Action dated Aug. 2, 2010 in U.S. Appl. No. 10/955,942, pp. 1-23.
U.S. Official Action dated Aug. 6, 2010 in U.S. Appl. No. 11/401,470, pp. 1-18.
U.S. Appl. No. 11/217,071, filed Aug. 30, 2005 entitled "Markup Based Extensibility for User Interfaces", pp. 1-35.
U.S. Official Action mailed Sep. 21, 2010 in U.S. Appl. No. 11/217,071, pp. 1-28.
U.S. Official Action mailed Sep. 27, 2010 in U.S. Appl. No. 10/836,154, pp. 1-28.
Mexican Office Action dated May 4, 2010 cited in Appln. No. 2005/008354, pp. 1-5.
Israeli Office Action dated Jul. 5, 2010 cited in Appln.: 169718, pp. 1-2.
Malaysian Substantive Examination Adverse Report dated Sep. 30, 2010 cited in Appln. No. PL20052959, pp. 1-4.
European Search Report dated Nov. 25, 2008 cited in Application EP 06 79 0087, pp. 1-2.
PCT Written Opinion and Search Report dated Sep. 2, 2010 cited in International Application No. PCT/US2010/021888, pp. 1-9.
Australian Office Action dated Oct. 21, 2010 cited in Appln No. 2006284908, pp. 1-2.
Chinese Second Office Action dated Oct. 29, 2010 cited in Appln No. 200680030421.2, pp. 1-13.
Paul J. Perronne, et al.: "Building Java Enterprise Systems with J2EE"; Publisher : Sams; Jun. 7, 2000, pp. 1-8.
"The Style Attribute and CSS Declarations," http://www.webreference.com/html/tutorial5/2, Aug. 20, 1998, 4 pgs.
"External Style Sheets," http://www.webreference.com/html/tutorial5/9.html, Aug. 20, 1998, 3 pgs.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Chinese Office Action dated Apr. 3, 2009 cited in Appln No. 200510089514.X, pp. 1-12.
Israeli Office Action dated Sep. 6, 2009 cited in Appln No. 169716, pp. 1-2.
Israeli Office Action dated Sep. 7, 2009 cited in Appln No. 169718, pp. 1-2.
Russian Office Action dated Sep. 10, 2009 cited in Appln No. 2005125836/09(029010), pp. 1-10.
Russian Office Action dated Sep. 10, 2009 cited in Appln No. 2005125839/09(029013), pp. 1-16.
European Communication dated Sep. 28, 2009 cited in Appln No. 09006972.5-2211, pp. 1-6.
Chinese Office Action dated Oct. 16, 2009 cited in Appln No. 200510092142.6, pp. 1-9.
U.S. Official Action dated May 30, 2008 cited in U.S. Appl. No. 11/430,562, pp. 1-30.
U.S. Official Action dated Jun. 27, 2008 cited in U.S. Appl. No. 11/430,416, pp. 1-29.
U.S. Official Action dated Sep. 26, 2007 in U.S. Appl. No. 11/151,686, pp. 1-19.
U.S. Official Action dated Dec. 9, 2009 cited in U.S. Appl. No. 12/028,797, pp. 1-13.
U.S. Official Action dated Dec. 10, 2009 cited in U.S. Appl. No. 10/955,940, pp. 1-15.
U.S. Official Action dated Dec. 8, 2009 cited in U.S. Appl. No. 11/151,686, pp. 1-24.
U.S. Official Action dated Mar. 14, 2011 in U.S. Appl. No. 12/163,784 pp. 1-55.
Notice on Reexamination dated Jan. 21, 2011 cited in Appln No. 200510089514.X.
Chinese Third Office Action dated Feb. 10, 2011 cited in Appln No. 200680033212.3.

(56) References Cited

OTHER PUBLICATIONS

U.S. Official Action dated Feb. 11, 2011 in U.S. Appl. No. 11/401,470.
Egypt Official Decision dated Mar. 14, 2011 cited in Appln No. 2005080371, 2 pgs.
Malaysian Substantive Examination Adverse Report dated Mar. 15, 2011 cited in Appln No. PI 20053260, 3 pgs.
2nd Notice on Reexamination dated Mar. 25, 2011 cited in Appln No. 200510089514.X, 9 pgs.
U.S. Official Action dated Apr. 21, 2011 in U.S. Appl. No. 12/574,256, 16 pgs.
U.S. Appl. No. 13/102,633, filed May 6, 2011 entitled "Markup Based Extensibility for User Interfaces".
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
Seo et al, "Hangul Office 2000 Tutoring Book", Sep. 15, 2000, 16 pgs.
Office 2007, Microsoft, Released on Nov. 6, 2006, 23 pgs.
Mexican Office Action dated Mar. 31, 2011 cited in Appln No. PA/a/2005/008351, 46 pp.
Mexican Office Action dated Mar. 31, 2011 cited in Appln No. PA/a/2005/008349, 40 pp.
Mexican Office Action dated Mar. 31, 2011 cited in Appln No. PA/a/2005/008350, 40 pp.
Philippines Examiner's Action dated Apr. 12, 2011 cited in Appln No. 1-2005-00404, 1 pp.
Japanese Notice of Rejection dated May 6, 2011 cited in Appln. No. 2005-236089, 4 pp.
Japanese Notice of Rejection dated May 6, 2011 cited in Appln. No. 2005-236087, 2 pp.
Korean Notice of Rejection dated May 17, 2011 cited in Appln No. 10-2004-48176, 9 pp.
Chinese Second Office Action dated May 19, 2011 cited in Appln No. 200780020312.7, 9 pp.
Russian Office Action dated Jun. 14, 2011 cited in Appln No. 2008147090, 2 pp.
U.S. Official Action dated May 19, 2011 in U.S. Appl. No. 10/851,506, 24 pp.
U.S. Official Action dated Jun. 9, 2011 in U.S. Appl. No. 12/464,584, 51 pp.
"The New Look in Office 12 / Office 2007", Office Watch, posted Sep. 20, 2005, 9 pgs.
"Look and Layout", retrieved at <<http://liv.ac.uk/csd/email/outlook/layout.htm>>, University of Liverpool, 9 pgs.
"Reading Pane in Conversation View", retrieved at <<http://www.zimbra.com/forums/users/5918-reading-pane-conversation-view.html>>, 5 pgs.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Mexican Office Action dated Jan. 6, 2011 cited in Appln No. PA/a/2005/008354.
Australian OA dated Jan. 17, 2011 cited in Application No. 2006287408.
Chinese Second Office Action dated Apr. 7, 2011 cited in Application No. 200680032789.2, w/translation.
Japanese Office Action dated Jun. 10, 2011 cited in JP Application No. 2008-530229, w/translation.
Chinese Third Office Action dated Jun. 21, 2011 cited in Appln No. 200680030421.2.
Chinese Second Office Action dated Jul. 14, 2011 cited in Appln No. 20680018095.3.
Chinese Decision on Rejection dated Jul. 21, 2011 cited in Appln No. 20068032789.2.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Mexican Office Action dated Oct. 3, 2011 in Appln. No. MX/a/2008/014849, 10 pages.
Bellavista et al., "A Mobile Infrastructure for Terminal, User, and Resource Mobility", Network Operations and Management Symposium, NOMS 2000, pp. 877-890, IEEE/IFIP, 2000.
"Microsoft Office Professional Plus 2007", © 2006, Microsoft Corporation; 66 pgs.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, Jul. 4, 2007.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al., "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005_SE&hl=en&ct=clnk&cd=3&gl=in.
Israeli Office Action dated Oct. 28, 2010 cited in Appln No. 169716.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
Mexican Office Action dated May 26, 2011 in Appln. No. MX/a/2009/004151, 4 pg.
Korean Preliminary Rejection dated Aug. 23, 2011 in Appln. No. 10-2005-0067236, 5 pg.
Korean Preliminary Rejection dated Aug. 23, 2011 in Appln. No. 10-2005-0067411, 6 pg.
Korean Preliminary Rejection dated Aug. 29, 2011 in Appln. No. 10-2005-0066460, 7 pg.
Australian Office Action dated Aug. 31, 2011 in Appln. No. 2007255043, 3 pg.
3rd Official Notice, Mailing No. 134028, dated Sep. 16, 2001 in Appln. No. PH1707009, 2 pg.
4th Official Notice, Mailing No. 134052, dated Sep. 16, 2001 in Appln. No. PH1707009, 2 pg.
U.S. Official Action dated Sep. 13, 2011 in U.S. Appl. No. 12/372,386, 84 pg.
U.S. Official Action dated Sep. 14, 2011 in U.S. Appl. No. 12/163,758, 56 pg.
Dr. Dobb's Journal; "Windows 95 Common Controls"; May 1, 1995; 12 pgs.

(56) References Cited

OTHER PUBLICATIONS

Korean Notice of Rejection dated Nov. 3, 2011 in Appln No.10-2005-0067257.
Japanese Notice of Rejection dated Nov. 4, 2011 in Appln No. 2008-513476.
Japanese Notice of Rejection dated Nov. 11, 2011 in Appln. No. 2008-530229.
Chinese Office Action dated Nov. 18, 2011 in Appln. No. 200910148820.4.
Chinese Office Action dated Nov. 29, 2011 in Appln. No. 200980124383.0.
Chinese Third Office Action dated Dec. 5, 2011 in Appln. No. 200680018095.3.
European Search Report dated Dec. 6, 2011 in Appln No. 06803424.8.
U.S. Official Action dated Oct. 25, 2011 in U.S. Appl. No. 12/144,642, 45 pages.
U.S. Official Action dated Nov. 2, 2011 in U.S. Appl. No. 10/836,154, 26 pages.
U.S. Appl. No. 11/154,278, filed Jun. 16, 2005 entitled "Cross Version and Cross Product User Interface Compatibility", pp. 1-30.
U.S. Appl. No. 11/151,686, filed Jun. 13, 2005 entitled "Floating Command Object", pp. 1-33.
U.S. Appl. No. 11/401,470, filed Apr. 10, 2006 entitled "Command User Interface for Displaying Selectable Functionality Controls in a Database Application", pp. 1-63.
U.S. Appl. No. 10/982,073, filed Nov. 5, 2004 entitled "Gallery User Interface Controls", pp. 1-37.
U.S. Appl. No. 10/607,020, filed Jun. 26, 2003 entitled "Side-by-Side Shared Calendars", pp. 1-39.
U.S. Appl. No. 11/782,059, filed Jul. 24, 2007 entitled "Methods, Systems, and Computer-Readable Mediums for Providing Persisting and Continuously Updating Search Folders", pp. 1-60.
U.S. Appl. No. 10/836,154, filed Apr. 30, 2004 entitled "Combined Content Selection and Display User Interface", pp. 1-42.
U.S. Appl. No. 10/848,774, filed May 19, 2004 entitled "Automatic Grouping of Electronic Mail", pp. 1-54.
U.S. Appl. No. 10/851,442, filed May 21, 2004 entitled "Conversation Grouping of Electronic Mail Records", pp. 1-32.
U.S. Appl. No. 10/851,506, filed May 21, 2004 entitled "Adaptive Multi-Line View User Interface" , pp. 1-28.
U.S. Appl. No. 10/955,941, filed Sep. 30, 2004 entitled "An Improved User Interface for Displaying Selectable Software Functionality Controls that are Relevant to a Selected Object", pp. 1-45.
U.S. Appl. No. 10/955,940, filed Sep. 30, 2004 entitled "An Improved User for Displaying Selectable Software Functionality Controls that are Contextually Relevant to a Selected Object", pp. 1-36.
U.S. Appl. No. 10/955,967, filed Sep. 30, 2004 entitled "Command User Interface for Displaying Selectable Software Functionality Controls", pp. 1-37.
U.S. Appl. No. 10/955,942, filed Sep. 30, 2004 entitled "An Improved User Interface for Displaying a Gallery of Formatting Options Applicable to a Selected Object", pp. 1-43.
U.S. Appl. No. 10/955,928, filed Sep. 30, 2004 entitled "User Interface for Providing Task Management and Calendar Information", pp. 1-33.
U.S. Appl. No. 10/800,056, filed Mar. 12, 2004 entitled "Method and System for Data Binding in a Block Structured User Interface Scripting Language", pp. 1-25.
U.S. Appl. No. 12/372,386, filed Feb. 17, 2009 entitled "Command User Interface for Displaying Multiple Sections of Software Functionality Controls", pp. 1-50.
U.S. Appl. No. 12/163,758, filed Jun. 27, 2008 entitled "Communication Between a Document Editor-in-Space User Interface and a Document Editor Out-Space User Interface", pp. 1-51.
U.S. Appl. No. 12/163,784, filed Jun. 27, 2008 entitled "Exposing Non-Authoring Features Through Document Status Information in an Out-Space User Interface", pp. 1-49.
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
Raman, "Cascaded Speech Style Sheets," 1997, 7 pgs.
"Primary Windows," http://www-03.ibm.com/servers/eserver/iseries/navigator/guidelines/primary.html, 23 pgs, downloaded Feb. 23, 2007.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999, 3 pp.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.
Marshall School of Business: "Workshop IV—Calendar," http://www.marshal.usc.edu/computing/PDF_Files/Outlook/Workshop4, PDF, Apr. 10, 2000, pp. 1-14.
M. Williams, "Programming Windows NT4: Unleashed," Sams Publishing, Indianapolis, 1996, pp. index & 167-185.
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi~rainy/index.php?pn=probjects&project=rainlendar>.

(56) References Cited

OTHER PUBLICATIONS

Microsoft Windows XP Professional, Version 2002, Service pack 2, 4 pgs.
Camarda, Using Microsoft Word 97, copyright 1997, QUE Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.
Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A₃D Tab Control Example," Jan. 4, 2008, http://microsoft.apress.com/asptodayarchive/71723/creating-a-visual-arresting-user-interface-a-3d-tab-control-example, 12 pages.
"Omni Web Help," Omni Group, 2004, http://www.onmigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
"Convert to Word 2007," http://www.regencytraining.com/word-2007-conversion.html, *Regency Training and Consulting*, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages. (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," *Natural Language Engineering*, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," *Herschel CSDT Meeeting*, pp. 1-21 (Sep. 2007).
Krill, P., "Microsoft's Ribbon Interface Draws Frowns, Smiles," *InfoWorld*, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
"TeeChart for .NET Charting Control," TeeChart for NET Steema Software. http://Iwww.teechart.net.
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendump—Microsoft Office, Microsoft Corporation, Microsoft Office Professional Edition 2003, 13 pages.
Danish Written Opinion Appl. No. SG 200504508-3 dated Sep. 18, 2006, pp. 1-9.
Danish Search Report Appl. No. SG 200504475-5 dated Sep. 19, 2006, pp. 1-6.
NZ Application No. 541300, Examination Report dated Jul. 25, 2005, pp. 1-2.
Australian Search Report dated Jan. 16, 2007 in Singapore Application No. 200504474-8, pp. 1-8.
PCT Search Report dated Feb. 6, 2007 in International Application No. PCT/US2006/035467, pp. 1-10.
PCT Search Report dated Feb. 26, 2007 in International Application No. PCT/US2006/034993, pp. 1-11.
European Communicated dated Oct. 20, 2005 in EP Application No. 04102463.0-2211 PCT/, pp. 1-4.
Australian Written Opinion/Search Report in Singapore Application No. 200505257-6 mailed Feb. 12, 2007, pp. 1-6.
International Search Report dated Oct. 17, 2007 in International Application No. PCT/US2006/012724, pp. 1-11.
Chinese First Office Action dated Mar. 21, 2008 in Appln No. 200510092146.4, pp. 1-21.
Chinese First Office Action dated Mar. 21, 2008 in Appln No. 200510092139.4, pp. 1-25.
Chinese First Office Action dated Apr. 11, 2008 in Appln No. 200510092141.1, pp. 1-21.
Chinese First Office Action dated Apr. 18, 2008 in Appln No. 200510092142.6., pp. 1-22.
Philippines Examiner's Action dated Apr. 21, 2008 in Appln No. 1-2005-000405, pp. 1.
Philippines Examiner's Action dated Apr. 21, 2008 in Appln No. 1-2005-000406, pp. 1.
Chinese First Office Action dated May 23, 2008 in Appln No. 200510089514.X., pp. 1-16.
European Summons to Attend Oral Proceedings dated Jun. 23, 2008 in Appln No. 04102463.9., pp. 1.
Philippines Examiner's Action dated Jul. 31, 2008 in Appln No. 12005000495., pp. 1.
Philippines Examiner's Action dated Aug. 19, 2008 in Appln No. 12005000405., pp. 1.
Philippines Examiner's Action dated Sep. 12, 2008 in Appln No. 1200500406., pp. 1.
Chinese Second Office Action dated Oct. 10, 2008 in Appln No. 200510092141.1., pp. 1-22.
Chinese Second Office Action dated Oct. 17, 2008 in Appln No. 200510092139.4., pp. 1-17.
Chinese Second Office Action dated Jul. 3, 2009 in Appln No. 200680018095.3, pp. 1-14.
Chinese Second Office Action dated Nov. 21, 2008 in Appln No. 200510089514.X., pp. 1-14.
Chilean Office Action dated Nov. 27, 2008 in Appln No. 1768-2005, pp. 1-10.
Chilean Office Action dated Sep. 23, 2008 in Appln No. 1770-2005, pp. 1-10.
Chilean Office Action dated Nov. 27, 2008 in Appln No. 1769-2005, pp. 1-11.
Chilean Second Office Action dated Mar. 4, 2009 in Appln No. 2512-2005, pp. 1-12.

(56) References Cited

OTHER PUBLICATIONS

Supplementary European Search Report dated May 28, 2009 in EP Application No. 07795391.7-1225, pp. 1-7.
U.S. Official Action dated Nov. 25, 2008 in U.S. Appl. No. 11/154,278., pp. 1-43.
Russian Office Action dated Jul. 21, 2009 in Appln No. 2005125837/09(029011), pp. 1-12.
Russian Office Action dated Jul. 30, 2009 in Appln No. 2005125831/09(029005), pp. 1-17.
European Search Report dated Sep. 7, 2009 in EP Application No. 09006972.5-2211, pp. 1-5.
Third Chinese Office Action mailed Jun. 19, 2009 in 200510092139.4, pp. 1-4.
Mexican Office Action mailed Mar. 3, 2009 in Mexican Application No. PA/a/2005/008351, pp. 1-4.
Mexican Office Action mailed Feb. 5, 2009 in Mexican Application No. PA/a/2005/008349, pp. 1-10.
Russian Office Action mailed Jun. 24, 2009 in 200512 0363, pp. 1-8.
European Communication dated Sep. 14, 2009 in Appln. No. 07795391.7-1225, pp. 1-5.
Mexican Office Action mailed Jun. 19, 2009 in Mexican Application No. 2005.07073., pp. 1-6.
U.S. Official Action dated Dec. 23, 2003 in U.S. Appl. No. 09/896,384, pp. 1-9.
U.S. Notice of Allowance dated Aug. 24, 2004 in U.S. Appl. No. 09/896,384, pp. 1-9.
U.S. Official Action dated Apr. 27, 2006 in U.S. Appl. No. 10/800,056, pp. 1-8.
U.S. Final Official Action dated Oct. 19, 2006 in U.S. Appl. No. 10/800,056, pp. 1-12.
U.S. Official Action dated Apr. 12, 2007 in U.S. Appl. No. 10/851,506, pp. 1-20.
U.S. Official Action dated Jun. 4, 2007 in U.S. Appl. No. 10/955,940, pp. 1-26.
U.S. Official Action dated Jul. 26, 2006 in U.S. Appl. No. 10/741,407, pp. 1-30.
U.S. Final Official Action dated Jan. 23, 2007 in U.S. Appl. No. 10/741,407, pp. 1-22.
U.S. Notice of Allowance dated Apr. 10, 2007 in U.S. Appl. No. 10/741,407, pp. 1-8.
U.S. Official Action dated Jan. 4, 2007 in U.S. Appl. No. 10/607,020, pp. 1-16.
U.S. Official Action dated Jun. 14, 2007 in U.S. Appl. No. 10/836,154, pp. 1-18.
U.S. Official Action dated Jun. 21, 2007 in U.S. Appl. No. 10/955,928, pp. 1-21.
U.S. Notice of Allowance dated Jul. 5, 2007 in U.S. Appl. No. 10/607,020, pp. 1-6.
U.S. Official Action dated Jul. 11, 2007 in U.S. Appl. No. 10/955,941, pp. 1-15.
U.S. Official Action dated Jul. 11, 2007 in U.S. Appl. No. 10/955,967, pp. 1-19.
U.S. Official Action dated Jul. 11, 2007 in U.S. Appl. No. 10/955,942, pp. 1-23.
U.S. Official Action dated Jul. 13, 2007 in U.S. Appl. No. 10/800,056, pp. 1-11.
U.S. Official Action dated Oct. 9, 2007 in U.S. Appl. No. 10/982,073, pp. 1-15.
U.S. Official Action dated Dec. 4, 2007 in U.S. Appl. No. 10/955,940, pp. 1-15.
U.S. Official Action dated Dec. 21, 2007 in U.S. Appl. No. 10/851,506, pp. 1-22.
U.S. Official Action dated Dec. 28, 2007 in U.S. Appl. No. 10/800,056, pp. 1-25.
U.S. Official Action dated Jan. 8, 2008 in U.S. Appl. No. 10/955,928, pp. 1-34.
U.S. Official Action dated Jan. 28, 2008 in U.S. Appl. No. 10/836,154, pp. 1-26.
U.S. Official Action dated Feb. 20, 2008 in U.S. Appl. No. 10/848,774, pp. 1-42.
U.S. Official Action dated Feb. 21, 2008 in U.S. Appl. No. 10/851,442, pp. 1-33.
U.S. Official Action dated Apr. 15, 2008 in U.S. Appl. No. 10/955,942, pp. 1-25.
U.S. Official Action dated Apr. 16, 2008 in U.S. Appl. No. 10/955,967, pp. 1-31.
U.S. Official Action dated Apr. 29, 2008 in U.S. Appl. No. 10/955,941, pp. 1-21.
U.S. Official Action dated May 28, 2008 in U.S. Appl. No. 10/982,073, pp. 1-15.
U.S. Official Action dated Jun. 19, 2008 in U.S. Appl. No. 10/851,506, pp. 1-39.
U.S. Official Action dated Jun. 20, 2008 in U.S. Appl. No. 10/955,928., pp. 1-34.
U.S. Official Action dated Jul. 17, 2008 in U.S. Appl. No. 10/955,940., pp. 1-26.
U.S. Official Action dated Jul. 24, 2008 in U.S. Appl. No. 11/151,686., pp. 1-30.
U.S. Official Action dated Oct. 28, 2008 in U.S. Appl. No. 11/151,686., pp. 1-19.
U.S. Official Action dated Nov. 13, 2009 in U.S. Appl. No. 11/154,278., pp. 1-32.
U.S. Official Action dated Dec. 11, 2008 in U.S. Appl. No. 10/982,073., pp. 1-12.
U.S. Official Action dated Dec. 23, 2008 in U.S. Appl. No. 10/955,942, pp. 1-30.
U.S. Official Action dated Dec. 24, 2008 in U.S. Appl. No. 10/955,967, pp. 1-27.
U.S. Official Action dated Jan. 6, 2009 in U.S. Appl. No. 10/955,941, pp. 1-32.
U.S. Official Action dated Mar. 18, 2009 in U.S. Appl. No. 11/401,470, pp. 1-43.
U.S. Official Action dated Apr. 7, 2009 in U.S. Appl. No. 10/955,940, pp. 1-23.
U.S. Official Action dated Apr. 28, 2009 in U.S. Appl. No. 12/028,797, pp. 1-30.
U.S. Official Action dated Aug. 18, 2009 in U.S. Appl. No. 11/782,059, pp. 1-52.
U.S. Official Action dated Aug. 4, 2009 in U.S. Appl. No. 10/955,942, pp. 1-28.
U.S. Official Action dated Sep. 6, 2007 in U.S. Appl. No. 11/136,800, pp. 1-16.
U.S. Official Action dated Jul. 9, 2008 in U.S. Appl. No. 11/136,800, pp. 1-31.
U.S. Official Action dated Sep. 23, 2009 in U.S. Appl. No. 11/401,470, pp. 1-20.
U.S. Official Action dated Jun. 24, 2009 in U.S. Appl. No. 10/607,020, pp. 1-19.
U.S. Official Action dated Jun. 8, 2009 in U.S. Appl. No. 10/982,073, pp. 1-16.
U.S. Official Action dated Jun. 10, 2009 in U.S. Appl. No. 11/154,278, pp. 1-35.
U.S. Official Action dated Jun. 11, 2009 in U.S. Appl. No. 11/151,686, pp. 1-26.
U.S. Official Action dated Aug. 4, 2009 in U.S. Appl. No. 10/955,967, pp. 1-30.
Mexican Office Action Summary dated Jun. 25, 2012 in Appln No. PA/a/2005/008354, 25 pages.
Malaysian Examination Report dated Aug. 30, 2012 in Appln No. PI 20080400, 3 pages.
Chinese Second Office Action dated Sep. 12, 2012 in Appln No. 200980124944.7, 13 pages.
Mexican Office Action Summary dated Sep. 18, 2012 in Appln No. MX/a/2008/003342, 8 pages.
Chilean Office Action dated Sep. 21, 2012 in Appln No. 1560-2010, w/English Language Summary, 8 pages.
EP Communication dated Sep. 26, 2012 in Appln No. PCT/US2006/034993, 10 pages.
U.S. Official Action dated Aug. 7, 2012 in U.S. Appl. No. 10/836,154, 41 pages.
U.S. Official Action dated Sep. 11, 2012 in U.S. Appl. No. 12/163,784, 49 pages.

(56) References Cited

OTHER PUBLICATIONS

U.S. Official Action dated Sep. 13, 2012 in U.S. Appl. No. 13/437,031, 79 pages.
Israeli Office Action dated Jun. 3, 2012 in Appln No. 189293, 4 pages.
Israeli Office Action dated Aug. 29, 2012 in Appln No. 169717, 4 pages.
Korean Notice of Preliminary Rejection dated Nov. 12, 2012 in K-10-2008-7005939, 7 pages.
Canadian Office Action dated Nov. 23, 2012 in Appln No. 2,512,102, 5 pages.
Canadian Office Action dated Nov. 29, 2012 in Appln No. 2,512,047, 4 pages.
Chinese Second Office Action dated Dec. 17, 2012 in Appln No. 200980124644.9, 10 pages.
U.S. Official Action dated Oct. 24, 2012 in U.S. Appl. No. 13/102,633, 41 pages.
U.S. Official Action dated Nov. 23, 2012 in U.S. Appl. No. 11/782,059, 49 pages.
U.S. Official Action dated Dec. 5, 2012 in U.S. Appl. No. 12/777,287, 36 pages.
Redmond, Tony; Excerpt from Book; Microsoft Exchange Server 2003; Published 2003; 14 pgs.
Chinese Office Action dated Jul. 2, 2012 in Appln No. 200980124944.7, 8 pages.
Korean Notice of Preliminary Rejection dated Jul. 2, 2012 in Appln No. 10-2012-0024393, 5 pages.
Chinese Office Action dated Jul. 12, 2012 in Appln No. 201080008789.5, 8 pages.
Korean Notice of Preliminary Rejection dated Jul. 19, 2012 in Appln No. 10-2007-7024571, 6 pages.
Chinese Decision on Rejection dated Jul. 31, 2012 in Appln No. 200680018095.3, 17 pages.
Chinese Office Action dated Aug. 2, 2012 in Appln No. 200980124945.1, 8 pages.
Chinese Third Office Action dated Aug. 14, 2012 in Appln No. 200980124383.0, 8 pages.
U.S. Official Action dated Jun. 19, 2012 in U.S. Appl. No. 12/769,787, 94 pages.
Changing a Graph Type: Ultimate Illustration of Excel 2002 for Windows XP, General Book, X-media Corp., Aug. 31, 2002, p. 224.
Mexican Office Action dated Feb. 3, 2012 in Appln No. MX/A/2008/002889 with summary, 12 pages.
Taiwan Office Action dated Feb. 8, 2012 in Appln No. 94123640, with Eng Lang Summary, 15 pages.
Israeli Office Action dated Feb. 23, 2012 in Appln No. 170668, 20 pages.
Chinese Fourth Office Action dated Apr. 27, 2012 in Appln No. 200680018095.3, 8 pages.
Japanese Notice of Rejection dated May 11, 2012 in Appln No. 2009-513223, 6 pages.
U.S. Official Action dated Apr. 26, 2012 in U.S. Appl. No. 11/782,059, 35 pages.
U.S. Official Action dated May 8, 2012 in U.S. Appl. No. 12/144,642, 27 pages.
Malaysian Substantive Examination Adverse Report dated Jan. 31, 2012 in Appln No. PI 20053258, 3 pages.
Malaysian Substantive Examination Adverse Report dated Jan. 31, 2012 in Appln No. PI 20053259, 3 pages.
European Search Report dated Feb. 23, 2012 in Appln No. 05107153.8, 8 pages.
Chinese Office Action dated Feb. 29, 2012 in Appln No. 200980124664.9, 9 pages.
Chinese Decision on Rejection dated Mar. 7, 2012 in Appln No. 200780020312.7, 5 pages.
Chinese Second Office Action dated Mar. 9, 2012 in Appln No. 200980124383.0, 10 pages.
Japanese Notice of Final Rejection dated Mar. 9, 2012 in Appln No. 2008-513476, 2 pages.
U.S. Official Action dated Feb. 27, 2012 in U.S. Appl. No. 12/372,386, 41 pages.
U.S. Official Action dated Mar. 14, 2012 in U.S. Appl. No. 12/142,927, 49 pages.
Russel et al., (hereinafter "Russel"); "Special Edition Using Microsoft® Office Outlook® 2003"; Que publishing on Sep. 25, 2003, 71 pgs.
Israeli Office Action dated May 3, 2012 in Appln No. 169718, 4 pages.
Taiwan Office Action dated May 14, 2012 in Appln No. 94122180, with Eng Lang Summary, 5 pages.
Mexican Office Action dated Jun. 6, 2012 in Appln No. MX/a/2008/014849, 8 pages.
Chinese Second Office Action dated Jun. 18, 2012 in Appln No. 200910148820.4, 6 pages.
Mexican Office Action dated Jun. 25, 2012 in Appln No. PA/a/2005/008354, 25 pages.
U.S. Official Action dated Jun. 6, 2012 in U.S. Appl. No. 12/777,287, 98 pages.
Mexican Office Action Summary dated Sep. 22, 2011 in Appln. No. MX/A/2008/003342, 10 pages.
Japanese Notice of Rejection dated Dec. 16, 2011 in Appln No. 2008-529218, 3 pages.
U.S. Official Action dated Jan. 12, 2012 in U.S. Appl. No. 11/782,059, 45 pages.
Microsoft Office 2007 Word Help, 3 pgs.
Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Chilean Second Office Action dated Nov. 21, 2012 in Appln No. 1559-2010, 6 pages.
Russian Office Action dated Dec. 12, 2012 in Appln No. 2010140069, 8 pages.
Chinese Third Office Action dated Dec. 31, 2012 in Appln No. 200980124944.7, 14 pages.
Chinese Second Office Action dated Dec. 31, 2012 in Appln No. 200980124945.1, 8 pages.
Chinese Second Office Action dated Jan. 4, 2013 in Appln No. 201080008789.5, 8 pages.
Chinese Office Action dated Jan. 6, 2013 in Appln No. 201080021957.4, 9 pages.
Canadian Office Action dated Jan. 18, 2013 in Appln No. 2,512,155, 6 pages.
U.S. Official Action dated Dec. 12, 2012 in U.S. Appl. No. 10/851,506, 76 pages.
U.S. Official Action dated Dec. 12, 2012 in U.S. Appl. No. 12/954,952, 86 pages.
U.S. Official Action dated Dec. 31, 2012 in U.S. Appl. No. 12/142,927, 49 pages.
Canadian Office Action dated Nov. 29, 2012 in Appln No. 2,512,036, 2 pgs.
EP Communication dated Jan. 10, 2013 in Appln No. PCT/US2010/021888, 8 pgs.
Malaysia Substantive Examination Adverse Report dated Jan. 15, 2013 in Appln No. PI 20084401, 3 pgs.
EP Search Report dated Jan. 30, 2013 in Appln No. PCT/US2009/044059, 8 pgs.
Mexican Office Action dated Feb. 5, 2013 in Appln No. MX/a/2008/014849, 8 pgs.
Chinese Office Action dated Feb. 5, 2013 in Appln No. 200910148820.4, 5 pgs.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Japanese Notice of Rejection dated Nov. 25, 2011 in Appln. No. 2008-531249, 8 pages.
Korean Notice of Rejection dated Jan. 30, 2012 in Appln No. 10-2004-0048176, 5 pages.
Japanese Notice of Rejection dated Feb. 3, 2012 in Appln No. 2008-530218, 6 pages.
U.S. Official Action dated Jan. 26, 2012 in U.S. Appl. No. 12/464,584, 32 pages.

(56) References Cited

OTHER PUBLICATIONS

U.S. Appl. No. 12/725,605, filed Mar. 17, 2010 entitled "Improved User Interface for Displaying Selectable Software Functionality Controls that are Relevant to a Selected Object", pp. 1-45.
Padwick, Gordon "Using Microsoft Outlook 2000", 1999 Que Publishing, pp. 530-533.
Slovak, Ken, "Absolute Beginner's Guide to Microsoft Office Outlook 2003," 2003 Que Publishing, pp. 237-241.
Microsoft Press, Microsoft Computer Dictionary, Microsoft Press, published 2002, Fifth Edition, pp. 374, 382.
Riggsby, McCoy, Haberman and Falciani, "Mastering Lotus Notes and Domino 6" 2003, pp. 18, 22, 33-35, 47, 122, 123, 215-241, 378.
Find any file or email on your PC as fast as you can type!, http://www.x1.com, 2003, 1 page.
"About Google Desktop Search", http://www.desktop.google.com/about.html, Oct. 15, 2004, 8 pages.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
PCT Search Report and Written Opinion dated Nov. 30, 2009 in International Application No. PCT/US2009/046341, pp. 1-11.
Chilean Second Office Action dated Nov. 4, 2009 in Appln No. 1770-2005, pp. 1-7.
Chilean Second Office Action dated Jan. 29, 2010 in Appln No. 1769-2005, pp. 1-7.
Philippines Examiner's Action dated Mar. 11, 2010 in Appln No. 1-2005-000405, p. 1.
New Zealand Application No. 541299, Examination Report dated Jul. 25, 2005, pp. 1-2.
New Zealand Application No. 541301, Examination Report dated Jul. 25, 2005, pp. 1-2.
"Microsoft Enters Desktop Search Fray", http://www.internetnews.com/ent-news/article.php/3447331, Dec. 13, 2004, 5 pages.
"Windows Desktop Search". Http://kunal.kundale.net/reviews/wds.html, Jul. 10, 2005, 7 pages.
"Microsoft Desktop Search (beta)", http://www.pcmag.com/article2/0.1895.1771841.00.asp, Mar. 2, 2005.
"Microsoft reinvents its own wheel", http://www.theinquirer.net/default.aspx?article=20214, Dec. 14, 2004, 5 pages.
Screendumps—Microsoft Office (Microsoft Corporation, Microsoft Office Professional Edition 2003; 16 pages).
Chinese Office Action dated Nov. 27, 2009 in Appln No. 200680033212.3, pp. 1-8.
Chinese Office Action dated Jan. 22, 2010 in Appln No. 200680032564.7, pp. 1-7.
Russian Office Action dated Oct. 30, 2009 in Appln No. 2005125837/09(029011), pp. 1-5.
Russian Office Action dated Dec. 28, 2009 in Appln No. 2005125836/09(029010), pp. 1-2.
U.S. Official Action dated Jan. 7, 2010 in U.S. Appl. No. 11/430,562, pp. 1-38.
U.S. Official Action dated Aug. 17, 2009 in U.S. Appl. No. 11/430,561, pp. 1-17.
U.S. Official Action dated Jun. 19, 2009 in U.S. Appl. No. 11/430,562, pp. 1-40.
U.S. Official Action dated Jan. 9, 2009 in U.S. Appl. No. 11/430,561, pp. 1-35.
U.S. Official Action dated Nov. 13, 2008 in U.S. Appl. No. 11/430,562, 1-32.
U.S. Official Action dated Jan. 6, 2010 in U.S. Appl. No. 10/607,020, pp. 1-29.
U.S. Official Action dated Jan. 20 2010 in U.S. Appl. No. 10/955,967, pp. 1-26.
U.S. Official Action dated Jan. 25, 2010 in U.S. Appl. No. 10/982,073, pp. 1-12.
U.S. Official Action dated Feb. 18, 2010 in U.S. Appl. No. 11/782,059, pp. 1-27.
U.S. Official Action dated Feb. 19, 2010 in U.S. Appl. No. 10/955,942, pp. 1-21.
U.S. Official Action dated Feb. 22, 2010 in U.S. Appl. No. 11/401,470, pp. 1-18.
"Creating Charts: An Introductcion," *Excel® for Chemists: A Comprehensive Guide*, E. Joseph Billo. http://www.ahut.edu.cn/yxsz/ahkl/Teaching/Excel%20for%20Chemists/Ch02.pdf.
Marsh, Bruce, Integrating Spreadsheet Templates and Data Analysis Into Fluid Power Instruction, *Journal of Industrial Technology*, vol. 16, No. 4, Aug.-Oct. 2000. http://www.nait.org/jit/Articles/marsh071900.pdf.
"TeeChart for .NET Charting Control," TeeChart for NET Steema Software. http://www.teechart.net.
U.S. Appl. No. 12/954,952, filed Nov. 29, 2010 entitled "Gallery User Interface Controls".
U.S. Appl. No. 13/027,289, filed Feb. 15, 2011 entitled "Floating Command Object".
"The New "Office 2007" User Interface", Microsoft Corporation © 2005, 32 pgs.
"The New Look in Office 12/Office 2007", Office Watch, posted Sep. 20, 2005, 9 pgs.
Atwood, "Sometime a Word is Worth a Thousand Icons", Coding Horror, Feb. 22, 2006, 9 pgs.
The Discussion Board Component of Blackboard: An Instructor's Guide; Aug. 2004; 23 pgs.
Hock, "Yahoo! To the Max"; May 10, 2005; 5 excerpted pgs.
Homeworking Forum; archived Dec. 6, 2004; 11 pgs.
Venolia et al., Gina Danielle, Supporting Email Workflow, revised Dec. 2001; 11 pgs.
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs., downloaded Mar. 3, 2008.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs., downloaded Mar. 3, 2008.
Ohmori, Yasuo et al., "Eigyo Mind—A Sales Support Tool," PFU Tech. Rev., vol. 10, No. 1, pp. 32-38, PFU Limited, May 1, 1999.
New Zealand Office Action dated Oct. 14, 2009 in NZ Application No. 566363.
European Office Action dated Jun. 15, 2010 in EP Application No. 06814358.5.
Russian Office Action dated Jul. 26, 2010 in RU Application No. 2008109034, w/translation.
Chinese Office Action dated Nov. 11, 2010 in CN Application No. 200680032789.2, w/translation.
Russian Office Action dated Nov. 12, 2010 in Application No. 2008109034, w/translation.
Mexican Office Action dated Jan. 6, 2011 in Appln No. PA/a/2005/008354.
Australian OA dated Jan. 17, 2011 in Application No. 2006287408.
Chinese Second Office Action dated Apr. 7, 2011 in Application No. 200680032789.2, w/translation.
Japanese Office Action dated Jun. 10, 2011 in JP Application No. 2008-530229, w/translation.
Chinese Third Office Action dated Jun. 21, 2011 in Appln No. 200680030421.2.
Chinese Second Office Action dated Jul. 14, 2011 in Appln No. 20680018095.3.
Chinese Decision on Rejection dated Jul. 21, 2011 in Appln No. 20068032789.2.
Korean Notice of Preliminary Rejection dated Jul. 22, 2011 in Appln No. 10-2005-0058160.
Japanese Notice of Rejection dated Aug. 12, 2011 in Appln. No. 2005-184990.
U.S. Official Action dated Oct. 5, 2009 in U.S. Appl. No. 11/332,822.
U.S. Official Action dated Apr. 23, 2010 in U.S. Appl. No. 12/144,642.

(56) References Cited

OTHER PUBLICATIONS

U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jun. 7, 2011 in U.S. Appl. No. 11/332,822.
U.S. Official Action dated Jul. 8, 2011 in U.S. Appl. No. 11/401,470.
U.S. Official Action dated Jul. 8, 2011 in U.S. Appl. No. 12/163,784.
U.S. Official Action dated Aug. 3, 2011 in U.S. Appl. No. 12/142,927.
Douglas et al., "Dynamic Popup Menu Titles"; IP.Com Journal, IP.COM Inc., West Henrietta, NY, Aug. 1, 1992, 2 pgs.
Haden et al.; "Scrollable Popup Menu with Selection Tracking Display of Graphical Objects", IP.Com Journal, IP.COM Inc., West Henrietta, NY, Aug. 1, 1994, 6 pgs.
"Index Card Metaphor for Multiple Property Sheets Associated with A Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov. 1990, 3 pgs.
Ribbons; Microsoft; © 2012 Microsoft; http://msdn.microsoft.com/en-us/library/windows/desktop/cc872782.aspx; 45 pgs.
AutoCAD 2011-Customization Guide; Feb. 2010; Autodesk, Inc.; http://images.autodesk.com/adsk/files/acad_acg.pdf; 554 pgs.
Chinese Decision on Reexamination dated Feb. 1, 2012 in Appln No. 200510089514.X, 23 pages.
European Search Report dated Feb. 15, 2012 in Appln No. 05107157.9, 8 pages.
European Search Report dated Feb. 28, 2012 in Appln No. 05107184.3, 8 pages.
Taiwan Search Report dated Mar. 14, 2012 in Appln No. 094123420, 7 pages.
European Search Report dated Mar. 16, 2012 in Appln No. 05107186.6, 8 pages.
Taiwan Notice of Allowance dated Mar. 29, 2012 in Appln No. 10120306600, 6 pages.
Chilean Office Action dated Mar. 29, 2012 in Appln No. 1560-2010, 5 pages.
Chilean Office Action dated Mar. 29, 2012 in Appln No. 1559-2010, 5 pages.
India First Examination Report dated Mar. 30, 2012 in Appln No. 1817/DEL/2005, 2 pages.
Japanese Notice of Allowance dated Apr. 11, 2012 in Appln No. 2008-530229, 6 pages.
U.S. Official Action dated Apr. 5, 2012 in U.S. Appl. No. 12/163,758, 28 pages.
U.S. Official Action dated Apr. 19, 2012 in U.S. Appl. No. 13/102,633, 90 pages.
Korean Notice of Rejection dated Feb. 22, 2013 in Appln No. 10-2008-7005078 13 pgs.
Mexican Office Action dated Feb. 25, 2013 in Appln No. MX/a/2008/002889, 11 pgs.
Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Miser, "Special Edition Using Mac OS X v10.2"; Pub. Date Jan. 3, 2003; QUE; Spe. Ed.; pp. 272-275.
Mori et al., "Design and Development of Multidevice User Interfaces through Multiple Logical Descriptions"; Aug. 2004; vol. 30; 14 pgs.
Malaysian Substantive Examination Report dated Oct. 31, 2012 in Appln No. PI 20053260, 2 pgs.
Canadian Office Action dated Nov. 29, 2012 in Appln No. 2,511,101 3 pgs.
Mexican Office Action dated Jan. 22, 2013 in Appln No. MX/a/2008/003342, 8 pages.
Mexican Office Action dated Mar. 22, 2013 in Appln No. PA/a/2005/008350, 28 pages.
EP Search Report dated Apr. 18, 2013 in Appln No. PCT/US2006/012724, 12 pgs.
Philippines Substantive Examination Report dated Apr. 25, 2013 in Appln No. 1-2005-000495, 2 pages.
EP Search Report dated May 10, 2013 in Appln No. PCT/US2009/044292, 6 pages.
Russian Office Action dated May 13, 2013 in Appln No. 2010-151922, 7 pages.
Korean Final Notice of Preliminary Rejection dated May 20, 2013 in Appln No. 10-2008-7005939, 3 pages.
Mexican Office Action dated May 23, 2013 in Appln No. MX/a/2008/003342, 8 pages.
Chinese Notice on Third Office Action dated Jun. 5, 2013 in Appln No. 200980124644.9, 10 pages.
Mexican Office Action dated Jun. 11, 2013 in Appln No. PA/a/2005/008351, 31 pages.
Mexican Office Action dated Jun. 20, 2013 in Appln No. MX/a/2010-014056, 6 pages.
U.S. Official Action dated Mar. 1, 2013 in U.S. Appl. No. 11/430,562, 66 pgs.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
U.S. Official Action dated Apr. 29, 2013 in U.S. Appl. No. 12/954,952, 18 pgs.
U.S. Official Action dated May 21, 2013 in U.S. Appl. No. 131437,031, 13 pgs.
U.S. Official Action dated May 23, 2013 in U.S. Appl. No. 11/401,470, 101 pgs.
U.S. Official Action dated Jun. 3, 2013 in U.S. Appl. No. 13/102,622, 29 pgs.
Stephanos Piperoglou, "The Style Attribute and CSS Declarations," http://www.webreference.com/html/tutorial5/2, Aug. 20, 1998, 4 pgs.
Stephanos Piperoglou, "External Style Sheets," http://www.webreference.com/html/tutorial5/9.html, Aug. 20, 1998, 3 pgs.
Microsoft, Screendumps—Microsoft Office, Microsoft Office Professional Edition 2003, Microsoft Corporation, 10 pages.
Microsoft, Screendumps—Microsoft Office Outlook, Microsoft Office Outlook Professional Edition 2003, Microsoft Corporation, 2 pages.
Chinese Office Action dated Apr. 3, 2009 in Appln No. 200510089514.X, 7 pages.
U.S. Official Action dated Sep. 26, 2007 in U.S. Appl. No. 11/151,686, 19 pages.
U.S. Appl. No. 13/595,084, filed Aug. 27, 2012 entitled "Command User Interface for Displaying Selectable Software Functionality Controls," Inventor: Harris et al.
U.S. Appl. No. 13/615,668, filed Sep. 14, 2012 entitled "User Interface for Displaying Selectable Software Functionality Controls that are Relevant to a Selected Object," Inventor: Satterfield et al.
U.S. Appl. No. 13/464,572, filed May 4, 2012 entitled "Accessing an Out-Space User Interface for a Document Editor Program," Inventor: Dukhon et al.
U.S. Appl. No. 13/769,598, filed Feb. 18, 2013 entitled "Automatic Conversation Techniques," Inventor: Affronti et al.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.

(56) References Cited

OTHER PUBLICATIONS

Sada, Morihiro; "Clue for Managing Common Data Filed on Server"; Business Personal Computer Age; vol. 15, No. 7; Dempa Publications, Inc.; Jul. 1, 1997; 1 pg.
PCT Written Opinion and Search Report dated Nov. 29, 2010 in International Application No. PCT/US2010/034277, 10 pages.
U.S. Appl. No. 13/437,031, filed Apr. 2, 2012 entitled "Automatic Grouping of Electronic Mail," Inventor: Satterfield et al.
U.S. Appl. No. 13/427,939, filed Mar. 23, 2012 entitled "An Improved User Interface for Displaying a Gallery of Formatting Options Applicable to a Selected Object," Inventor: Himberger et al.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
U.S. Official Action dated Aug. 2, 2013 in U.S. Appl. No. 12/777,287, 47 pgs.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
EP Communication dated Jul. 17, 2013 in Appln No. EP 07 795 391.7, 9 pages.
Chinese Second Office Action dated Aug. 5, 2013 in Appln No. 201080021957.4, 12 pages.
Russian Decision on Grant dated Aug. 12, 2013 in Appln No. 2010151922/08, 18 pages.

* cited by examiner

MODIFYING AND FORMATTING A CHART USING PICTORIALLY PROVIDED CHART ELEMENTS

BACKGROUND

Modifying a chart is a process for assisting a user to create or modify a standard chart into a customized chart using a series of visual chart elements representing how the standard chart can be changed. In some situations, when creating a chart the user normally has a preconceived notion of how a chart should be displayed. For example, the user may desire to create a chart for graphing various plotted points on an X and Y axis with each axis labeled. The user may also desire that each set of points be displayed in a different color and with a name associated with each set. However, the user may not know how to create such a chart because the user may be unfamiliar with the intricacies of the charting software, which leads to frustration by the user. It is with respect to these and other considerations that the present invention has been made.

SUMMARY

Modifying a chart may be provided. This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

In accordance with one embodiment, a method is provided for formatting a chart based on user preferences. The method receives a chart. The method also provides a plurality of chart elements to the user pictorially, wherein each picture represents a chart modification. Using the chart elements, the method modifies the formatting of the standard chart according to user preferences. The modified document is then displayed to the user including the user desired formatting.

According to another embodiment, a system is provided for modifying a chart including memory storage, a display device for viewing the modified chart, and a processing unit coupled to the memory storage for receiving a document. The system also provides a plurality of chart elements to a user. The system also receives user input from the user in relation to user preferences to the presented chart elements. Using the user preferred input, the system modifies the standard chart. The modified chart is then displayed to the user.

In accordance with yet another embodiment, a computer-readable medium is provided which stores a set of instructions which when executed performs a method for modifying a chart by receiving a standard chart. The computer-readable medium also provides chart elements to a user for use with the standard chart. Using the chart elements, the user provides the computer-readable medium with user preferences for a chart. Using the user preferences, the computer-readable medium modifies the standard chart to reflect how the user desires the chart to be displayed. The modified chart is then displayed to the user.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
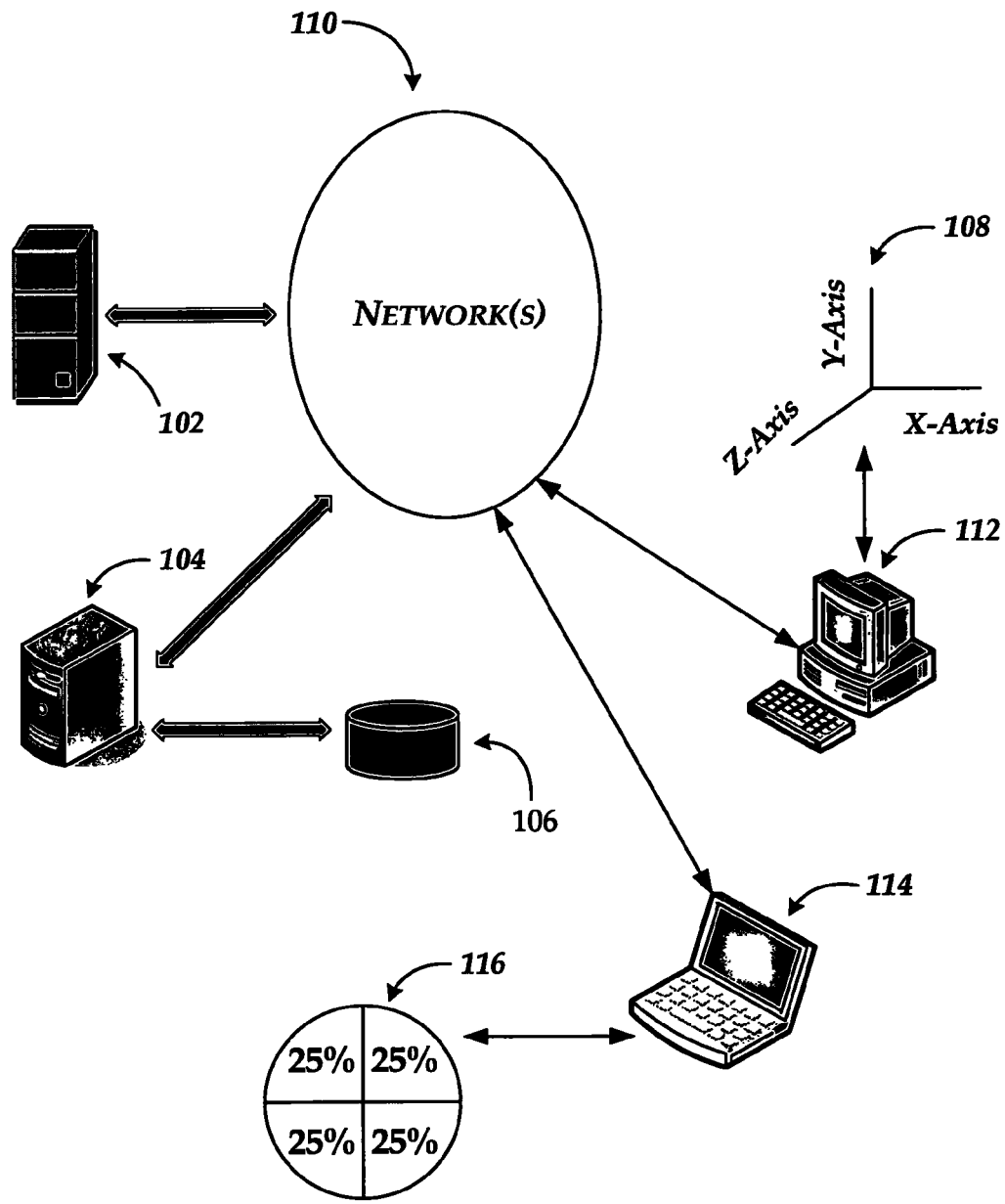
FIG. 1 illustrates a networked operating environment where embodiments may be practiced.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Modifying a chart may be provided. Consistent with embodiments of the present invention, a method and system for pictorially presenting to a user chart elements used to modify a standard chart is disclosed. Often when creating or editing a chart, a user may be unable to determine how to alter a standard chart to present data in a desired format, which leads to frustration by the user. Accordingly, if the user is provided with a pictorial representation of how to modify a chart, the user may more readily utilize all charting capabilities to create a desired chart.

An embodiment consistent with the invention may include a system for modifying a chart. The system may comprise a memory storage and a processing unit coupled to the memory storage. The processing unit may be operative to receive a standard chart and provide a plurality of chart elements for use with the standard chart. The processing unit may also be operative to receive input from the user regarding charting preferences and modify the standard chart to reflect the user's charting preferences. The system may use a display device to display the modified chart to the user.

Referring to FIG. 1, a networked system 100 is illustrated where example embodiments may be implemented. The networked system 100 may include a server 102, a server 104 which manages a database 106, a document 108 which may be created, edited and displayed using a desktop computer 112, and a laptop computer 114 that may be used to create, edit and display chart 116.

The networked environment 100 may transmit and receive data to and from other computing devices such as the server 102, the desktop computer 112, and the laptop computer 114. Various types of data may be created, edited and processed within a chart associated with document 108 and chart 116. Exchanged data may include, for example, graphs, scheduling information, mathematical calculations or the like. Furthermore, networked environment 100 may transmit or receive data to a storage system 106, which is managed by server 104. Other computing devices may participate in this networked system as well, and devices such as the desktop computer 112 may be used as a standalone device.

Computing devices connected to the networked environment 100 may communicate over network(s) 110. Network(s) 110 may include one or more networks. The network(s) 110 may include a secure network such as an enterprise network, or an unsecure network such as a wireless open network. By way of example, and not limitation, the network(s) may include wired media such as a wired network or direct-wired connection, and wireless media such as acoustic, RF, infrared and other wireless media.

Figure 2:
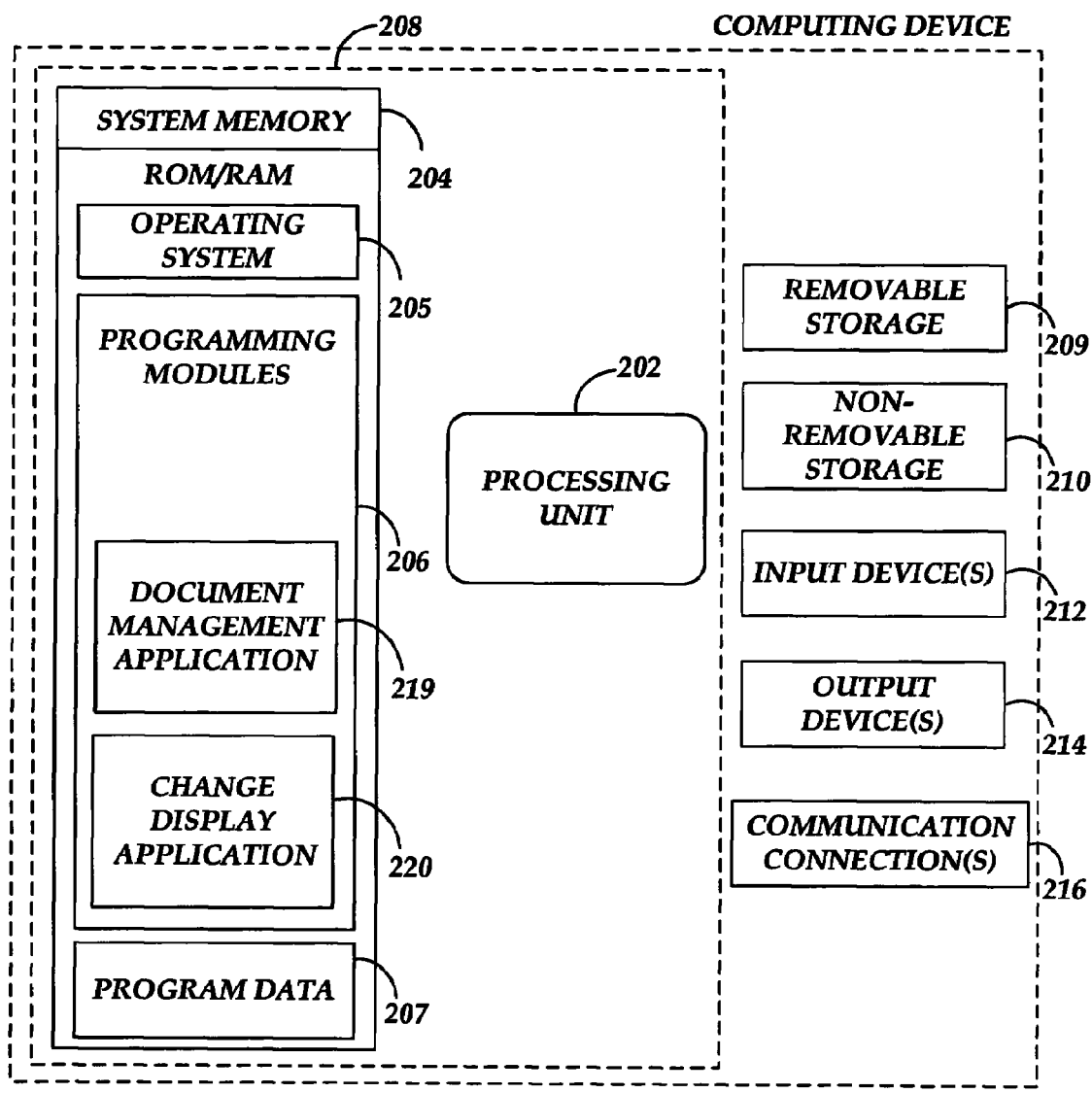
FIG. 2 is a block diagram of a system including a computing device.

FIG. 2 is a block diagram of a system including a computing device 200, which may reside in server 102, server 104, desktop computer 112, and laptop computer 114. Consistent with an embodiment of the invention, any suitable combination of hardware, software, or firmware may be used to implement a memory storage and processing unit. For example, the memory storage and processing unit may be implemented with computing device 200 or any of the other computing devices in combination with computing device 200. The aforementioned system, device, and processors are examples and other systems, devices, and processors may comprise the aforementioned memory storage and processing unit, consistent with embodiments of the invention. Furthermore, the computing device 200 may comprise an operating environment for an associated system. The system may operate in other environments and is not limited to computing device 200.

With reference to FIG. 2, a system consistent with an embodiment of the invention may include a computing device, such as computing device 200. In a basic configuration, computing device 200 may include at least one processing unit 202 and a system memory 204. Depending on the configuration and type of computing device, system memory 204 may comprise, but is not limited to, volatile (e.g. random access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include a document management application 219 for receiving a document or chart. Programming modules 206 may include a chart formatting display application 220 for visually providing chart modifying elements to a user. Furthermore, embodiments of the invention may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and nonvolatile, removable and non-removable media implemented in any method or technology for storage of information, such as computer readable instructions, data structures, program modules, or other data. System memory 204, removable storage 209, and non-removable storage 210 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also employ input device(s) 212 such as a keyboard, a mouse, a pen, a sound input device, a touch input device, etc. Output device(s) 214 such as a display, speakers, a printer, etc. may also be included. The aforementioned devices are examples and others may be used.

Computing device 200 may also contain a communication connection 216 that may allow device 200 to communicate with other computing devices, such as over network 110 in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 may perform processes including, for example, one or more method 300's stages as described below. The aforementioned process is an example, and processing unit 202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 3:
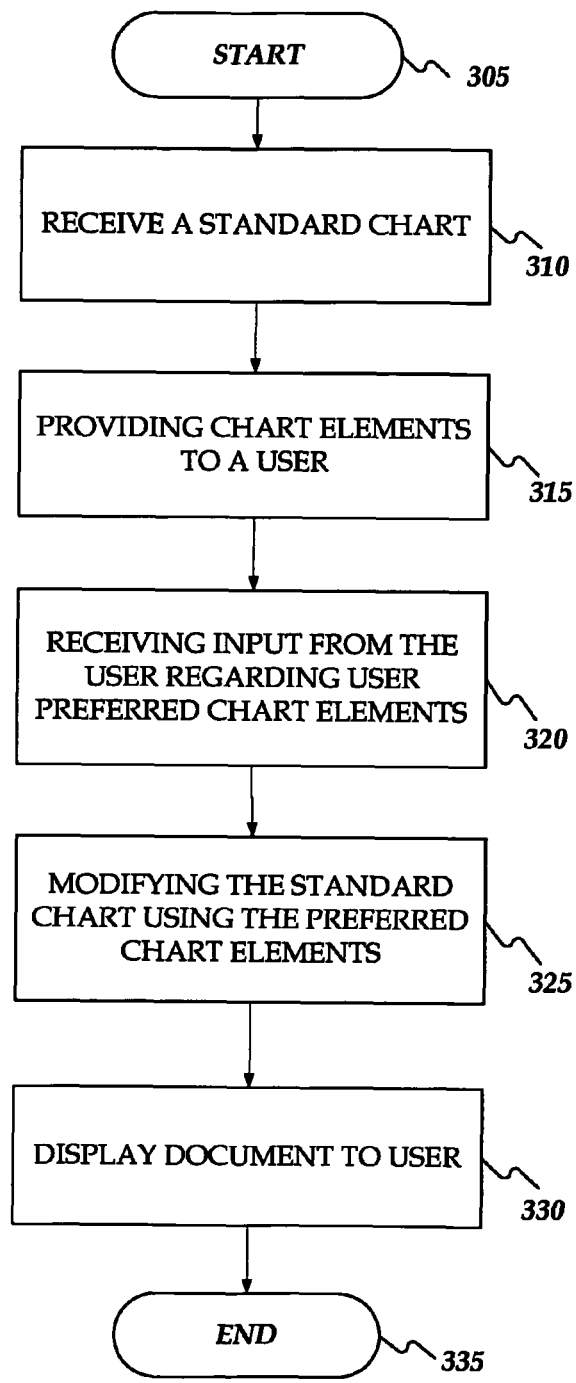
FIG. 3 is a flow chart of a method for modifying a chart.

FIG. 3 is a flow chart setting forth the general stages involved in a method 300 consistent with an embodiment of the invention for modifying a chart using computing device 200 of FIG. 2. Ways to implement the stages of method 300 will be described in greater detail below. Method 300 may begin at starting block 305 and proceed to stage 310 where computing device 200 may receive a chart. Once the chart is received, the method 300 proceeds to stage 315 where computing device 200 may provide chart elements visually to a user for use in tailoring the chart. For example, the user may be presented with a ribbon toolbar having a chart element for selecting grid lines. Next, at stage 320, the computing device 200 may receive chart preference input from the user based on the presented chart elements. For example, the user may desire to create a chart having an X and Y axis with titles for displaying speed versus time.

Next, at stage 325, the computing device 200 may modify the standard chart using the user preferred chart elements. At stage 330, the computing device 200 may display the modified chart to the user.

Thus, the user is provided with visual representations of how a standard chart may be modified for use by the user. Upon selection by the user, the computing device 200 modifies the standard chart based on the selected chart elements. Accordingly, a user may more fully utilize charting capabilities to tailor standard charts to the user's preference.

Figure 4:
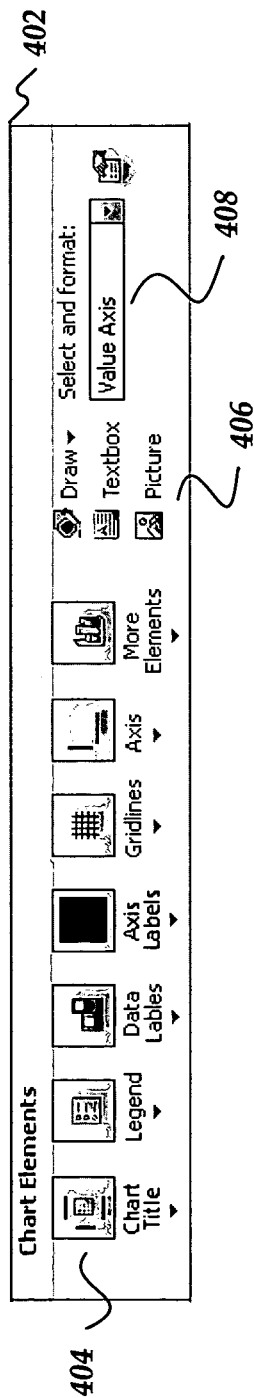
FIG. 4 is a screen shot illustrating a user interface for use with the computing device of FIG. 2.

FIG. 4 illustrates an exemplary user interface 400 for use in conjunction with the computing device 200, according to one embodiment. The user interface 400 includes a chart ribbon toolbar 402. Within the chart ribbon toolbar 402 are displayed a series of chart element gallery commands 404 for use by a user to modify a standard chart, for example, a chart title tab. Also, within the chart ribbon toolbar 402 resides a series of art objects 406 for use by the user to add and edit drawing elements, text and pictures. In addition, the chart ribbon toolbar 402 provides the user with tooltips 408 for use by the user to receive help on chart formatting. Accordingly, the user is presented with a chart ribbon toolbar 402 having visual chart elements for showing how the user may modify the standard chart.

Figure 5:
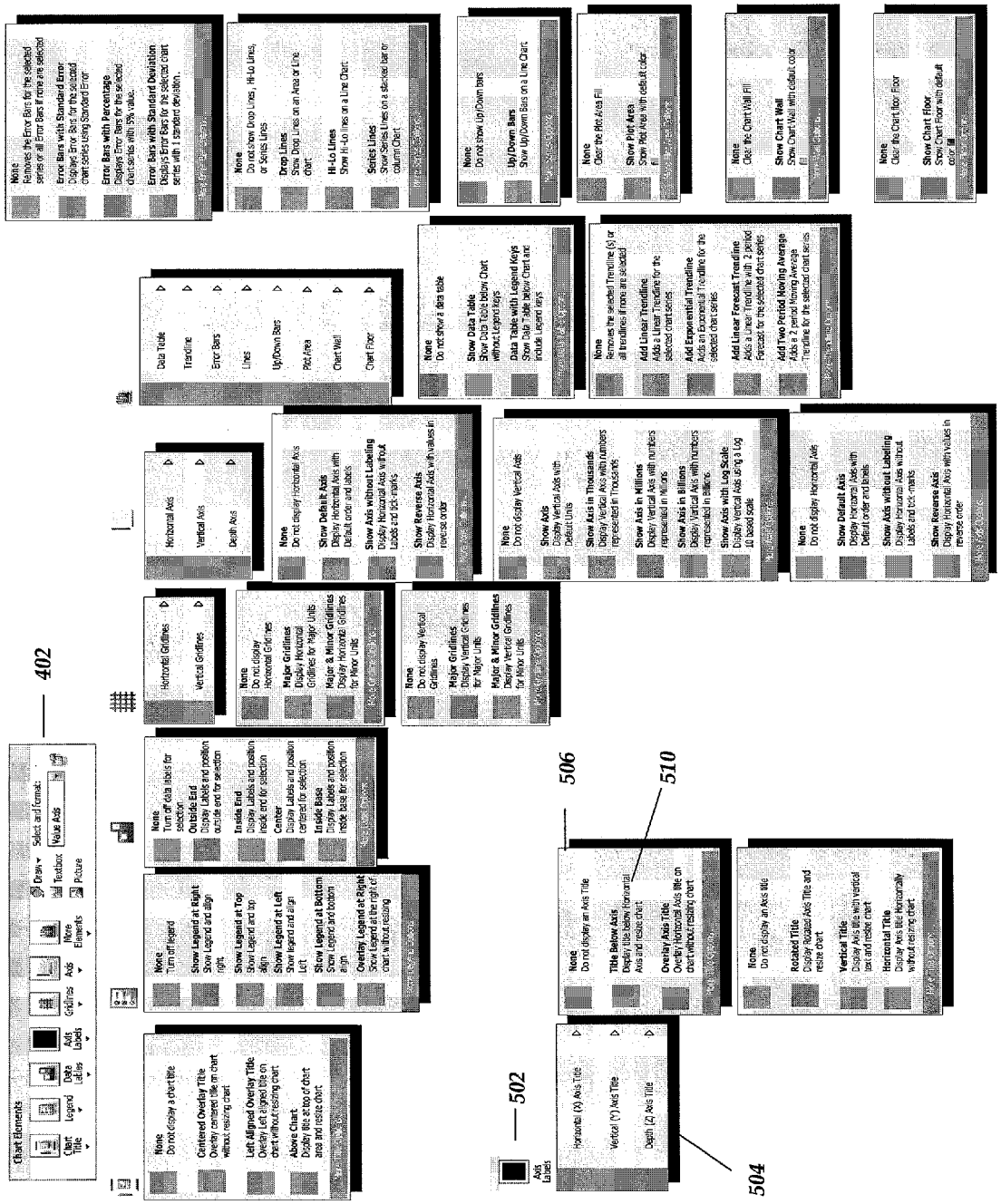
FIG. 5 is a screen shot further illustrating the user interface for use with the computing device of FIG. 2.

FIG. 5 illustrates an exemplary chart gallery structure 500 for use in conjunction with the chart ribbon toolbar 402, according to one embodiment. For instance, upon selecting a chart element gallery command 502, a gallery 504 representing possible modifications associated with a chart element (Axis Labels) may be presented to the user. For example, the gallery 504 presents the user with an option to modify a horizontal (X) Axis title, a vertical (Y) Axis title and depth (Z) Axis title. If the user selects, for example, the option to modify the horizontal (X) Axis title, the user is presented with a set of visual representations of how the horizontal (X) Axis title could be modified in a second stage gallery 506. Accordingly, the user may desire to place the title for the X Axis below the axis by selecting chart element 510. If the user does not see the desired option to modify the X Axis, the user may select a more selections option to display further options to modify the X Axis title. Thus, the user may utilize a plurality of galleries associated with a variety of chart element gallery commands, for example, Titles, Legends, Data Labels, Gridlines, Axes, More elements, or the like.

Consistent with embodiments of the present invention, modifying a chart may be provided for modifying a standard chart to a user's desired preferences. Chart elements used to modify the standard chart are presented to the user in a visual display to reduce confusion by the user on how a chart may be modified. Consistent with embodiments of the present invention, the chart formatting display application may reside in the computing device 200, a server connected to computing device 200, or both the computing device 200 and server connected to computing device 200.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for formatting a chart, the method comprising:
   receiving, by a computing device comprising a memory storage and a processing unit, a standard chart;
   providing, by the computing device, a plurality of chart elements pictorially, wherein each of the plurality of chart elements represents a chart modification for use in changing the standard chart;
   modifying, by the computing device, the standard chart with one or more of the plurality of chart elements, wherein modifying the standard chart comprises:
      presenting, by the computing device, a first gallery representing a feature of the standard chart for possible modification, wherein the feature of the standard chart for possible modification comprises a horizontal axis title, a vertical axis title, and a depth axis title;
      receiving, by the computing device, a user selection of the horizontal axis title for possible modification from the first gallery;
      in response to receiving the user selection of the horizontal axis title, presenting, by the computing device, a second gallery comprising a set of options as to how the selected horizontal axis title could be modified, the set of options comprising a first option to not display an axis title, a second option to display the axis title below a horizontal axis and to resize the standard chart, and a third option to overlay the horizontal axis title on the standard chart without resizing the standard chart; and
      receiving, by the computing device, a user selection of one of the options from the second gallery to modify the standard chart; and
   displaying, by the computing device, the modified chart.

2. The method of claim 1 further comprising receiving an input for selecting the plurality of chart elements.

3. The method of claim 1, wherein the plurality of chart elements reside in a chart ribbon.

4. The method of claim 3 further comprising providing a plurality of art objects in the chart ribbon for modifying the standard chart by adding and editing drawing elements, text and pictures.

5. A system for modifying a chart, the system comprising:
   a memory storage;
   a processing unit coupled to the memory storage, wherein the processing unit is operative to:
      receive a standard chart;
      provide a plurality of chart elements pictorially;
      receive input for selecting chart elements;
      modify the standard chart based on the received input, wherein the processing unit in modifying the standard chart is operative to:
         present a first gallery representing a feature of the standard chart for possible modification, wherein the feature of the standard chart for possible modification comprises a horizontal axis title, a vertical axis title, and a depth axis title;
         receive a selection of the horizontal axis title for possible modification from the first gallery;
         in response to receiving the selection, present a second gallery comprising a set of options as to how the selected horizontal axis title could be modified, the set of options comprising a first option to not display an axis title, a second option to display the axis title below a horizontal axis and to resize the standard chart, and a third option to overlay the horizontal axis title on the standard chart without resizing the standard chart; and
         receive a selection of one of the options from the second gallery to modify the standard chart; and
      display the modified chart; and
   a display device for displaying the modified chart.

6. The system of claim 5, wherein the processing unit is associated with a server.

7. The system of claim 5, wherein the processing unit is associated with a client-side device.

8. The system of claim 5, wherein the processing unit is further operative to provide a plurality of art objects in a chart ribbon comprising the plurality of chart elements for modifying the standard chart by adding and editing drawing elements, text and pictures.

* * * * *